US010933557B2

(12) United States Patent
Bolton et al.

(10) Patent No.: US 10,933,557 B2
(45) Date of Patent: Mar. 2, 2021

(54) METHOD AND SYSTEM FOR ADJUSTING THE PRODUCTION PROCESS OF A WOOD PRODUCT BASED ON A LEVEL OF IRREGULARITY OF A SURFACE OF THE WOOD PRODUCT USING NEAR INFRARED IMAGING

(71) Applicant: Boise Cascade Company, Boise, ID (US)

(72) Inventors: David Bolton, Lena, LA (US); Jude Richard Peek, Pineville, LA (US); Curtis Fennell, Boyce, LA (US)

(73) Assignee: Boise Cascade Company, Boise, ID (US)

( * ) Notice: Subject to any disclaimer, the term of this patent is extended or adjusted under 35 U.S.C. 154(b) by 0 days.

(21) Appl. No.: 16/697,466

(22) Filed: Nov. 27, 2019

(65) Prior Publication Data
US 2020/0171697 A1 Jun. 4, 2020

Related U.S. Application Data

(60) Provisional application No. 62/773,992, filed on Nov. 30, 2018.

(51) Int. Cl.
| *G01J 5/00* | (2006.01) |
| *B27K 5/00* | (2006.01) |
| *H04N 5/33* | (2006.01) |
| *G01N 21/359* | (2014.01) |
| *G06N 7/02* | (2006.01) |
| *G06T 1/20* | (2006.01) |
| *G01N 21/3563* | (2014.01) |

(52) U.S. Cl.
CPC .......... *B27K 5/001* (2013.01); *G01N 21/359* (2013.01); *G06N 7/023* (2013.01); *G06T 1/20* (2013.01); *H04N 5/33* (2013.01); *G01N 21/3563* (2013.01)

(58) Field of Classification Search
CPC .......... B27K 5/001; B27K 5/02; B27K 3/025; B27K 3/20; G06N 7/023; G06T 1/20; G06T 7/0004; H04N 5/33; G01N 21/359; G01N 21/3563; G01N 2021/4711; G01N 2021/4735; G01N 2021/1785
See application file for complete search history.

(56) References Cited

U.S. PATENT DOCUMENTS

| 5,892,808 A | 4/1999 | Goulding et al. |
| 5,960,104 A | 9/1999 | Conners et al. |
| 2005/0161118 A1 | 7/2005 | Carman et al. |

OTHER PUBLICATIONS

Nieminen et al., "Laser transillumination imaging for determining wood defects and gran angle," 2013, Measurement Science and Technology, vol. 24, No. 125401, 7 pages. (Year: 2013).*

(Continued)

*Primary Examiner* — Kiho Kim
(74) *Attorney, Agent, or Firm* — Hawley Troxell Ennis & Hawley LLP; Philip McKay

(57) ABSTRACT

Near InfraRed NIR technology, including NIR cameras and detectors, are used to detect irregularity in the surface of a wood product. Based on the detected irregularities at various locations in a given wood product, one or more actions are taken with respect to a production process used to produce the wood product to ensure the wood product is put to the most efficient, effective, and valuable use.

20 Claims, 23 Drawing Sheets

(56) References Cited

OTHER PUBLICATIONS

Colares et al., "Near infrared hyperspectral imaging and MCR-ALS applied for mapping chemical composition of the wood specie *Swietenia macrophylla* King (Mahogany) at microscopic level," 2016, Microchemical Journal, vol. 124, pp. 356-363. (Year: 2016).*
Tsuchikawa et al., "A review of recent application of near infrared spectroscopy to wood science and technology," 2015, Journal of Wood Science, vol. 61, pp. 213-220. (Year: 2015).*
Cognex Vision Software, "GigE Vision Cameras User's Guide," Published 2011.
Cognex, "Vision Controller Installation Manual," 2014.
Cognex, "Vision Product Guide," 2018.
USNR Transverse High Grader information sheet, copyright 2019; retrieved May 23, 2019 from https://www.usnr.com/en/product/THGLM.
USNR Lineal High Grader information sheet, copyright 2019; retrieved May 23, 2019 from https://www.usnr.com/en/product/LHGLM.
USNR LHG E-Valuator Module, copyright 2019; retrieved May 23, 2019 from https://www.usnr.com/en/product/LHGEValuatorLM.
USNR Planer/Dry Mill Optimization information sheet, copyright 2019; retrieved May 23, 2019 from https://www.usnr.com/en/product/mktoptplanermilllm.
Mecano Advantages information sheet, copyright 2019; retrieved May 23, 2019 from http://www.raute.com/mecano-advantages.
Mecano Solutions information sheet, copyright 2019; retrieved May 23, 2019 from http://www.raute.com/mecano-solutions.
Mecano Products information sheet, copyright 2019; retrieved May 23, 2019 from http://www.raute.com/264.
Drying Lines information sheets, copyright 2019; retrieved May 23, 2019 from http://www.raute.com/mecano-drying-lines?redirect=http%3A%2F%2Fwww.raute.com%2Flvl%3Fp_p_id%3%26p_plifecycle%3D0%26p_p_state% . . . .
Layup Lines information sheet, copyright 2019; retrieved May 23, 2019 from http://www.raute.com/mecano-layup-lines.
Veneer Handling Lines information sheet, copyright 2019; retrieved May 23, 2019 from http://www.raute.com/mecano-veneer-handling-lines.
Panel Handling Lines information sheet, copyright 2019; retrieved May 23, 2019 from http://www.raute.com/mecano-panel-handling-lines.
Peeling Lines information sheet, copyright 2019; retrieved May 23, 2019 from http://www.raute.com/268.
Smart Mill Concept information sheet, copyright 2019; retrieved May 23, 2019 from http://www.raute.com/smart-mill-concept.
Layup Lines information sheet, copyright 2019; retrieved May 23, 2019 from https://www.raute.com/mecano-layup-lines.

* cited by examiner

TABLE 1—COMMON VENEER DEFECTS AND CAUSES

| CAUSES | Loose veneer* | Rough veneer | Fuzzy veneer | Torn grain on tight side | Bulging knot on core | Thick & thin veneer across grain | Veneer thickness variation** | Veneer thickness variation# | Corrugated veneer surface | Spinout |
|---|---|---|---|---|---|---|---|---|---|---|
| Blocks too dry | | ■ | | | | | | | ■ | ■ |
| Blocks too cold | | | | | | | | | | ■ |
| Blocks too hot | | | ■ | | | | | | ■ | |
| Block ends too hot/ centers cold | | | | | | | | | ■ | |
| Knife dull | | | | ■ | | ■ | | | | |
| Knife angle too low | | ■ | | | | ■ | | | | |
| Knife angle too high | | ■ | | | | | | | ■ | |
| Knife edge set too low | | | | | | | | | | |
| Knife bevel angle too large | | | | | | | | | | |
| Nosebar pressure too low | | | | ■ | ■ | | ■ | | | ■ |
| Nosebar pressure too high | | | | ■ | ■ | | | | | |
| Nosebar (fixed) ground too sharp | | | | | | | ■ | | | |
| Looseness in lathe | ■ | ■ | | | | | | | | |
| Grain direction skewed | | | | | | | | | | |
| Block bends in lathe | | | | | | | | ■ | | |
| Heat expansion of knife | | | | | | | | ■ | | |
| Misaligned knife/ nosebar | | | | | | | | ■ | | |

FIG. 1B

MAGNIFIED VISUAL LIGHT IMAGE OF THE SURFACE OF VENEER RIBBON PRODUCED FROM AN OPTIMALLY PRECONDITIONED LOG

MAGNIFIED VISUAL LIGHT IMAGE OF THE SURFACE OF VENEER RIBBON PRODUCED FROM AN OVER PRECONDITIONED LOG

MAGNIFIED VISUAL LIGHT IMAGE
OF THE SURFACE OF VENEER
RIBBON PRODUCED FROM AN
UNDER PRECONDITIONED LOG

MAGNIFIED VISUAL LIGHT IMAGE
OF THE SURFACE OF VENEER
RIBBON PRODUCED FROM USING
A DAMAGED CUTTING KNIFE
EDGE

MAGNIFIED VISUAL LIGHT IMAGE OF VENEER RIBBON PRODUCED WHEN THE CUTTING KNIFE EDGE WAS NOT HELD AGAINST THE SURFACE OF THE PRECONDITIONED LOG WITH A STEADY PRESSURE

MAGNIFIED VISUAL LIGHT IMAGE OF THE SURFACE
OF A VENEER RIBBON PRODUCED WHEN THE
CUTTING KNIFE EDGE WAS DULL

NIR IMAGE OF THE SURFACE OF
VENEER RIBBON PRODUCED
FROM AN OPTIMALLY
PRECONDITIONED LOG

411

413

NIR IMAGE OF THE SURFACE OF
VENEER RIBBON PRODUCED
FROM AN OVER
PRECONDITIONED LOG

NIR IMAGE OF THE SURFACE OF
VENEER RIBBON PRODUCED
FROM AN UNDER
PRECONDITIONED LOG

NIR IMAGE OF THE SURFACE OF
VENEER RIBBON PRODUCED
FROM USING A DAMAGED
CUTTING KNIFE EDGE

NIR IMAGE OF THE SURFACE OF A VENEER RIBBON PRODUCED WHEN THE CUTTING KNIFE EDGE WAS NOT HELD AGAINST THE SURFACE OF THE PRECONDITIONED LOG WITH A STEADY PRESSURE

NIR IMAGE OF THE SURFACE OF A VENEER RIBBON PRODUCED WHEN THE CUTTING KNIFE EDGE WAS DULL

METHOD AND SYSTEM FOR ADJUSTING THE PRODUCTION PROCESS OF A WOOD PRODUCT BASED ON A LEVEL OF IRREGULARITY OF A SURFACE OF THE WOOD PRODUCT USING NEAR INFRARED IMAGING

RELATED APPLICATIONS

This application claims the benefit of David Bolton, U.S. Provisional Patent Application No. 62/773,992, filed on Nov. 30, 2018, entitled "NEAR-INFRARED SURFACE TEXTURE DETECTION IN WOOD PRODUCTS," which is hereby incorporated by reference in its entirety as if it were fully set forth herein.

This application is related to U.S. patent application Ser. No. 16/697,458, naming David Bolton as inventor, filed concurrently with the present application on Nov. 27, 2019, entitled "METHOD AND SYSTEM FOR ENSURING THE QUALITY OF A WOOD PRODUCT BASED ON SURFACE IRREGULARITIES USING NEAR INFRARED IMAGING," which is hereby incorporated by reference in its entirety as if it were fully set forth herein. This application is also related to U.S. patent application Ser. No. 16/697,461 naming David Bolton as inventor, filed concurrently with the present application on Nov. 27, 2019, entitled "METHOD AND SYSTEM FOR ENSURING THE QUALITY OF A WOOD PRODUCT BASED ON SURFACE IRREGULARITIES USING NEAR INFRARED IMAGING AND MACHINE LEARNING," which is hereby incorporated by reference in its entirety as if it were fully set forth herein.

BACKGROUND

There are numerous classes and types of wood products for use in a virtually limitless variety of applications. Wood product types include, but are not limited to: raw wood products such as logs, debarked blocks, green or dry veneer, and dimensional lumber; intermediate wood components, such as wood I-beam flanges and webs; and finished wood products such as laminated beams, plywood panels, Laminated Veneer Lumber (LVL), and wood beam/I-beam products.

One important metric that must be taken into account when producing and utilizing wood products is the surface texture of the wood product and any irregularities or uneven surfaces of the wood product. This is critical because the texture of the surfaces of a wood product can be indicative of several parameters including, but not limited to: how effectively and efficiently the wood product has been pre-processed prior to cutting; whether cutting systems used to cut the wood product are correctly adjusted and the physical condition of the components of the cutting systems; any defects or foreign material in the wood product; the quality of the wood product, and the best use for the wood product. In addition, smoothness and texture of the surfaces of a wood product are representative not only of the surface of the wood product compared to a parallel surface, but the underlying structural composition of the wood fibers composing the wood product.

Consequently, examining and monitoring the surface texture of a wood product can be critical to determining if the processing of a wood product is being conducted under optimal conditions, if the mechanisms used to process the wood product are in optimal condition and are operating correctly, and if the wood product itself is of the desired quality for the intended use of the wood product.

As one specific illustrative example, veneer is a primary component of numerous intermediate and finished wood products. However, like most wood products, veneer can have widely varying levels of strength, quality, and finish. Therefore, when working with veneer to produce intermediate or finished wood products, such as plywood or LVL, it is important to determine as accurately as possible the texture of the surfaces of the veneer.

Veneer is typically created by either stripping long ribbons of veneer from a wood source, such as a peeler log, using a rotary cutting process or using plain slicing methods on source logs or wood blocks when a more pronounced grain pattern is desired.

In a typical process, an entire tree (commonly called a log) is delivered to a mill for processing. The delivered logs are either used within a few days-weeks to prevent dry out or are sprinkled with water to prevent dry out during longer term storage before use. This prevents drying and splitting of the log.

Typically, the logs, i.e., the whole trees, are fed thru a debarker which strips the bark. Then the stripped logs are sent to a block saw that cuts the stripped logs to a desired length, typically 4'-12'. These 4' to 12' lengths of stripped log are often called blocks and/or herein referred to one type of wood source, or as peeler logs.

After being processed into blocks or peeler logs, preconditioning of the blocks is begun, typically almost immediately. As part of the preconditioning process, the blocks are sent to vats or "baths" of water that often include one or more caustic chemicals, such as sodium hydroxide, which tends to soften the wood chemically. In addition, the caustic water mixture is often heated and/or the blocks/peeler logs are stream treated to soften the component fibers and reduce splintering, cracking and breakage during and after processing.

This preconditioning process is critical to veneer production to ensure the peeling, or slicing, is successful, i.e., results in an unbroken ribbon or sheet of veneer of consistent texture. However, adjusting the preconditioning process has traditionally proven difficult. This is because finding the best combination of chemical composition of the caustic water mix, temperature of the caustic water mix, and soak time for the logs in the vats of caustic water mix is extremely challenging because the diameter of the parent logs, type of wood, density of the wood, and presence of foreign materials is not a constant in any natural resource, such as trees. Consequently, the optimal combination of specific chemical composition of the caustic water mix, specific temperature of the caustic water mix, and specific soak time for optimal preconditioning can vary not only from type of wood to type of wood, but from region to region, harvesting area to harvesting area, grove to grove, harvest to harvest, harvest time/season to harvest time/season, tree to tree, and even within the same tree.

However, if the optimal combination of preconditioning parameters is not found, then the resulting preconditioned logs can be over conditioned and "mushy" resulting in bubbled and overly soft veneer sheets, typically reduced in strength and that are more likely to break, or under conditioned, resulting in hard and roughly cut veneer sheets that are more likely to splinter, crack or break.

The situation described above is made even more complicated by the fact that outer surfaces of a parent log or other wood source are generally more conditioned than the inner surfaces. Consequently, a parent log whose outer diameter wood is correctly conditioned may have inner diameter wood that is under conditioned or not conditioned at all. Likewise, in order to ensure inner diameter wood is correctly conditioned, the outer diameter wood may become over conditioned.

The majority of veneer that is produced today, i.e., hardwood, decorative veneers, face and back veneers, inner plies for LVL veneer cores, and pine or fir veneers, are all typically rotary cut.

FIG. 1A shows a preconditioned wood source, in this example a peeler log 101, being processed into veneer ribbon using rotary cutting methods. When using the rotary cut method, the entire preconditioned peeler log 101 is held in place in a lathe system 100 with the help of a lathe chuck 105. Some lathes use one or more computerized methods to determine the true center of the log in order to optimize the yield (not shown). The rotation speed of the preconditioned peeler log 101 log is typically controlled and variable.

After optimally positioning the preconditioned peeler log 101, it is rotated in direction 103 against a carriage-mounted knife 110 on one side and a pressure bar 111 on the opposite side to cut veneer ribbons 120 of consistent thickness 121. The first few feet of veneer that are obtained when the preconditioned log is rotated may produce sheets of varying lengths. This is called "round-up". They can be used for different applications or may even be discarded Ideally, the rotating preconditioned peeler log 101 can start producing quality veneer ribbons 120 akin to cloth being pulled from a bolt. These veneer ribbons 120 are then fed into a clipping line (not shown) to obtain predetermined widths and to remove defects that include rotten areas, large knots, foreign objects, etc. Thereafter, the veneer sheets (not shown) are fed into a dryer (not shown) to reduce the moisture to a level acceptable for the purposed use of the veneer sheets. The dried veneer sheets (not shown) are conveyed to a grading section (not shown) where the veneer sheets are graded based on, but not limited to, the following parameters: structural strength, visual appearance, surface texture, width, length, thickness, moisture, etc.

In order to produce quality veneer ribbons 120, several processing parameters must be optimized in addition to the preconditioning parameters discussed above. These include, but are not limited to: ensuring the cutting knife 110 is relatively sharp and free from damage and defects; ensuring the knife is kept at the optimal angle 131 with respect to the preconditioned peeling log surface 107; ensuring the pressure applied by pressure bar 111 keeps the knife 110 in steady contact with the preconditioned peeling log surface 107.

As seen above, in order for high quality veneer to be successfully produced, it is important that the wood source, such as peeler logs, be properly preconditioned using optimally adjusted precondition parameters such as the chemical composition of the soaking water, the temperature of the soaking water, and the soak time. In addition, it is equally important that the processing parameters such as ensuring the cutting knife is relatively sharp and free from damage and defects, ensuring the knife is kept a the optimal angle with respect to the preconditioned peeling log surface, ensuring the pressure applied by a pressure bar keeps the knife in steady contact with the preconditioned peeling log surface must be optimized as the veneer sheets are being cut from the wood source. The preconditioning parameters and processing parameters discussed above are referred to collectively herein as production parameters.

FIG. 1B shows a table of example production parameters and the effect variance in the production parameters can have on the wood product, e.g., on the resulting veneer ribbon or sheet.

As is evident in FIG. 1B, and from the discussion above, in order to most efficiently process a wood source, such a peeler logs, into high quality wood product, such as quality veneer ribbon, numerous production variables/parameters must be optimized and adjusted. When dealing with natural materials that are often inconsistent in composition, such as preconditioned peeler logs, and processing mechanisms, such as lathes, knife blades, and pressure systems, this can be a very difficult and a dynamically changing environment.

It follows that monitoring the variables/parameters associated with log preconditioning and processing is critical to the veneer making process. However, traditionally, this has proven very difficult for several reasons. First, as discussed above, finding the best combination of chemical composition of the caustic water mix, temperature of the caustic water mix, and soak time for the logs in the vats of caustic water mix for preconditioning is extremely complicated and challenging, not only because of the varying physical parameters of the individual blocks/peeler logs, but ambient temperature and relative humidity fluctuations as well.

However, determining whether the preconditioning processing of parent logs is effective can, in theory be determined by analyzing the texture of the veneer sheets that were produced from the log. Traditionally, this was accomplished by examining the surfaces of the veneer ribbons or sheets under magnification after a parent log, or multiple logs, were fully processed into veneer ribbon.

It is known that under magnification, veneer created from wood source preconditioned using different preconditioning parameters, e.g. from over conditioned logs, from optimally conditioned logs, and from under conditioned logs has a different surface texture that can be identified under magnified conditions using visible light.

FIG. 2A shows a side view of a magnified surface 203 of veneer ribbon 201 that was produced from an optimally preconditioned log. In the specific illustrative example of FIG. 2A, the veneer thickness 205 is approximately 0.166 inches and the magnification level is 10×

As seen in FIG. 2A, magnified surface 203 of veneer ribbon 201 is relatively consistent in grain and texture down the entire magnified surface 203 of veneer ribbon 201 and has no cracks, bulges or bubbles, or sections of significantly uneven grain or width.

FIG. 2B is a representation of a magnified surface 213 of a veneer ribbon 211 that was produced from an over preconditioned wood source.

As seen in FIG. 2B, due to the over conditioning of the wood source used to generate veneer ribbon 211, magnified surface 213 includes bubbles 215. Typically bubbles 215 result in veneer ribbon 211 having a "mushy" consistency. Bubbles 215 are typically formed of pulled wood fiber. When sheets of veneer are utilized that are cut from veneer ribbon from over conditioned wood sources, such as veneer ribbon 211, and the veneer sheets are stacked, the fibers making up bubbles 215 can be compressed back to relatively flat. However, the structural strength is not regained and this, in turn, results in a degraded strength and inferior texture for veneer ribbon 211 and any wood products created with veneer ribbon 211.

FIG. 2C shows the magnified surface 223 of a veneer ribbon 221 that was produced from an under preconditioned wood source.

As seen in FIG. 2C, due to the under conditioning of the wood source used to generate veneer ribbon 221, magnified surface 223 includes rips/tears 225. Rips/tears 225 are the result of the veneer ribbon 221 being cut from too dry and hard a wood source due to insufficient preconditioning of the wood source, such as a peeler log. This, in turn, results in degraded strength and inferior texture for veneer ribbon 221. The magnification level in FIG. 2C is approximately 10×.

Similarly, non-optimal processing parameters such as, uneven knife edges, a dull knife, and uneven knife pressure also results in visual imperfections that can be identified under magnified conditions using visible light.

FIG. 2D shows the magnified surface 233 of a veneer ribbon 231 that was produced using a damaged knife having one or more nicks or other knife edge damage.

As seen in FIG. 2D, due to the damaged knife edge used to generate veneer ribbon 231, magnified surface 233 includes repeating scratches 235. Scratches 235 are the result of the damage/imperfection in the edge of the knife used to produce veneer ribbon 231 This, in turn, results in inferior texture for surface 233 of veneer ribbon 231.

FIG. 2E is an illustrated representation the magnified surface 243 of a veneer ribbon 241, as seen from a side view, that was produced using a knife that was not kept at a constant pressure against the surface of the wood source, such as a preconditioned peeling log.

As seen in FIG. 2E, magnified surface 243 of a veneer ribbon 241 is uneven and "wavy" and includes curvatures 242 due the fact that veneer ribbon 241 was produced using a knife that was not kept at a constant pressure against the surface of the wood source. This wavy nature of the magnified surface 243 of a veneer ribbon 241 creates stress points at each curvature. It is these stress points that often cause a veneer ribbon such as veneer ribbon 241 to break as it is flexed in downstream processing.

FIG. 2F shows a magnified side view of a surface 253 of a veneer ribbon 251 that was produced using a knife that was dull, as seen in side view.

As seen in FIG. 2F, due to the dull knife edge used to generate veneer ribbon 251, magnified surface 253 is irregular and includes irregularities or bumps 255. Bumps 255 are the result of the fact that a dull knife tends to move away from or ride over the block/peeler log when hard spots, i.e., areas of high density in the peeler log, are encountered. This produces a veneer ribbon 251 that, as shown in FIG. 2F can vary in thickness and surface flatness. In contrast, a sharp knife would shear the hard wood smoothly without being pushed back.

As noted, traditionally the effects of improper conditioning and damaged or incorrectly adjusted cutting mechanisms were identified by magnifying the surface of the veneer ribbon or sheet and then examining the magnified surface. Given the processing and production line speeds, this visual examination of the magnified veneer surface was done offline, and typically after an entire log, group of logs, or multiple sheets of veneer had been processed. In addition, since the samples needed to be magnified using traditional visual light-based systems, the sample sizes had to be relatively small, on the order of a few inches by a few inches, and were taken relatively infrequently, such as every few feet or more of veneer ribbon.

Consequently, using traditional methods, a defect in the preconditioning or cutting mechanisms, i.e., non-optimized production parameters, was often only discovered after significant amounts of defective product were produced. The result was that large amounts of inferior or unusable product was often processed and produced before any problem was detected. This is neither an ideal situation for the producer of the wood products or the end customer who inevitably must pay a higher price to take into account these inefficiencies. It also represents an extremely unfortunate waste of natural and human resources.

As noted, traditionally the effects of improper conditioning and/or damaged or incorrectly adjusted cutting mechanisms using visual examination of the magnified veneer surface was done offline, and typically after an entire log, group of logs, or multiple ribbons of veneer had been processed. This is because the traditional methods rely on examination of the veneer surfaces using visible light and visible light is problematic for several reasons.

First, visible light represents the spectrum of frequencies extending from 430 to 7100 Terahertz (Thz) which equates relatively large wavelengths extending 380 to 740 nanometers (nm). Consequently, the detail that can be discerned at these relatively large wavelengths is less than that that could be discerned using electromagnetic energy of smaller wavelengths. Consequently, using visible light sources, only the most significant surface features can be detected with the naked eye.

Therefore, surface areas being examined using visible light methods must be magnified. Since the images must be magnified using traditional visible light techniques, the veneer surface must be analyzed in smaller sections and can't be accomplished easily, or often at all, at the speeds of a typical production line. Therefore, the analysis must be conducted offline, or the production line would have to be slowed to an unacceptable speed.

In addition, visible light is subject to interference and dilution by the background light and ambient light sources that must be present on any production line to maintain a safe workplace. Consequently, the surface areas must be magnified, and the evaluation must be conducted offline and away from background ambient light sources present on the production line.

While veneer ribbon or sheets are discussed above as an illustrative example, accurately examining surface texture is important for any wood product, and especially for those wood products used as layers or that are composed of layers. This is because the presence of a rougher than optimal surfaces of veneer products can determine what uses the wood product can be put to and if the finished or intermediate wood product will remain structurally sound during and after processing. As a specific illustrative example, the texture of the surface of a wood product to be used as a layer in a finished or intermediate wood product can be critical in determining what type, and how much, adhesive should be used in processing the wood product and other processing parameters.

The use of veneer, and other layered wood products, allows wood products of various thickness and dimensions to be created without milling a board of the desired thickness or dimension from a single log or single piece of lumber. This, in turn, allows for much more efficient use of natural resources. Indeed, without the use of various layered wood technologies, such as veneer products, the forests of the planet would have been depleted long ago simply to meet the construction needs of the ever-increasing world population. However, the presence of irregular surfaces in layered sheets can create serious problems, such as cracks or other defects, in the layered wood product. This, of course, results in compromised structural integrity of the layered wood product and/or undesirable imperfections in the appearance of the layered wood product.

Therefore, there exists a long-standing technical problem of accurately and efficiently determining the surface texture of a wood product and then using this information to adjust preconditioning and processing parameters, i.e., production parameters, associated with the wood product to conserve resources, ensure safely, and consistently generate high quality wood products. In addition, the technical solution needs to be capable of being implemented without significantly slowing down the production process or increasing the cost of the finished wood product.

SUMMARY

Embodiments of the present disclosure provide an effective and efficient technical solution to the technical problem of accurately and efficiently detecting irregularities in a surface of a wood product, such as veneer ribbons or sheets. In addition, the disclosed technical solution is capable of detecting irregularities in a wide range of samples sizes ranging from of a traditional 2"×2" square, to a full 4'×8' sheet or panel surface, and, by using a series of NIR images spliced together, up to a 80'-120' ribbon of material. Consequently, the disclosed embodiments can be implemented without significantly slowing down the production process or increasing the cost of the finished wood product.

To this end, embodiments of the present disclosure utilize Near InfraRed (NIR) technology, including Near InfraRed/Short Wave InfraRed (NIR/SWIR) cameras and detectors, to accurately identify surface irregularities and the specific locations of the irregularities in a wood product, such as a veneer ribbon or veneer sheet. As discussed in more detail below, in some embodiments, an irregularity level to greyscale mapping database is generated that maps surface irregularities to NIR image greyscale values for one or more wood products, such as, but not limited to, one or more types of veneer. In one embodiment, the surface irregularity level to greyscale mapping database includes mapping data obtained via controlled empirical methods.

In one embodiment, an NIR analysis station is provided. In one embodiment, the NIR analysis station includes one or more sources of illumination positioned to illuminate at least one surface of a wood product. In one embodiment, the NIR analysis station includes one or more NIR/SWIR cameras, hereafter referred to as simply NIR cameras, positioned to capture one or more NIR images of the illuminated surface of the wood product.

In one embodiment, a wood product to be analyzed is positioned in, or passed through, the NIR analysis station such that a surface of the wood product to be analyzed is illuminated by the one or more illumination sources. The one or more NIR cameras are then used to capture one or more NIR images of the illuminated surface of the wood product.

In one embodiment, the one or more NIR images of the illuminated surface of the wood product are converted to NIR greyscale images with different greyscale values indicating different irregularity sizes, heights, or levels in the illuminated surface of the wood product.

In one embodiment, the greyscale values shown in the NIR greyscale images are processed using the surface irregularity level to greyscale mapping database to identify irregularity sizes, heights, or levels over the entire surface of the wood product.

In one embodiment, the wood product is then graded based on the identified irregularity levels and their positions/locations over the surface of the wood product. In one embodiment, based, at least in part, on the grade assigned to the wood product being analyzed, one or more actions are taken with respect to the wood product.

As discussed in more detail below, in some embodiments, one or more machine learning based surface irregularity prediction models are trained using NIR image data for one or more wood products along with various other production parameters and corresponding empirically determined irregularity levels and product failures for the one or more wood products.

In one embodiment, an NIR analysis station is provided that includes one or more sources of illumination positioned to illuminate a surface of a wood product and one or more NIR cameras positioned to capture one or more NIR images of the illuminated surface of the wood product.

In one embodiment, a wood product to be analyzed is positioned, or passed through, the NIR analysis station such that a first surface of the wood product to be analyzed is illuminated by the one or more illumination sources.

In one embodiment, one or more NIR images of the illuminated first surface of the wood product are then captured using the one or more NIR cameras and the one or more NIR images of the illuminated first surface of the wood product are processed to generate NIR image data for the illuminated first surface of the wood product.

In one embodiment, the NIR image data for the illuminated first surface of the wood product is then provided to the one or more trained machine learning based surface irregularity prediction models and surface irregularity prediction data for the wood product is obtained from the one or more trained machine learning based surface irregularity prediction models.

In one embodiment, a grade is assigned to the wood product based on the surface irregularity prediction data for the wood product and, based at least in part, on the grade assigned to the wood product, one or more actions are taken with respect to the wood product.

In one embodiment, production parameters such as preconditioning or processing parameters, of a wood product, such as a veneer ribbon, are dynamically adjusted based on a level of surface irregularity of a veneer ribbon surface.

In one embodiment, a surface irregularity level to greyscale mapping database is generated, that maps surface irregularities to Near InfraRed (NIR) image greyscale values for one or more wood products. In this embodiment, an NIR greyscale image to preconditioning level database is also generated mapping NIR greyscale images of a surface of a wood product to a preconditioning level of wood source used to produce the wood product.

In one embodiment, an NIR greyscale image to processing parameter database is generated mapping NIR greyscale images of a surface of a wood product to processing parameter values used to produce the wood product or one or more misadjusted processing parameters used to produce the one or more wood products.

In an alternative embodiment, one or more machine learning based production adjustment models are trained using Near InfraRed (NIR) image data for one or more wood products, such as veneer ribbons, and determined corresponding conditioning levels of wood source, such as logs, used to produce the one or more wood products or one or more misadjusted production parameters used to produce the one or more wood products.

In various embodiments, an NIR analysis station is provided that includes one or more sources of illumination positioned to illuminate a surface of a wood product, such as a veneer ribbon, and one or more NIR cameras positioned to capture one or more NIR images of the illuminated surface of the wood product.

In one embodiment, the wood product, such as a portion of a veneer ribbon, to be analyzed is positioned in the NIR analysis station such that a first surface of the wood product to be analyzed is illuminated by the one or more illumination sources.

In one embodiment, one or more NIR images of the illuminated first surface of the wood product are captured using the one or more NIR cameras and the one or more NIR images of the illuminated first surface of the wood product are processed to generate NIR greyscale images indicating different irregularity levels in the illuminated first surface of the veneer ribbon.

In one embodiment, the greyscale values shown in the NIR greyscale images are processed using the surface NIR greyscale image to preconditioning level database and/or the NIR greyscale image to processing parameter database to identify irregularity levels over the surface of the veneer sheet or other wood product analyzed.

In an alternative embodiment, the NIR image data for the illuminated first surface of the wood product is provided to the one or more trained machine learning based production adjustment models and production or processing adjustment parameter prediction data for the wood product is obtained from the one or more trained machine learning based surface irregularity prediction models.

Then, based on the determined preconditioning level or processing parameter maladjustment used to produce the wood product, or the determined necessary processing parameter adjustment, and/or the production or processing adjustment parameter prediction data, one or more one or more production parameters for producing subsequent wood product are adjusted.

In various embodiments, the one or more production parameters are preconditioning parameters for subsequent wood sources used to produce subsequent wood products and include: an amount of chemical used in a preconditioning liquid used to precondition the wood source; a type of chemical used in a preconditioning liquid used to precondition the wood source; a time the wood source soaks in a preconditioning liquid used to precondition wood source; and a temperature of a preconditioning liquid used to precondition the wood source.

In various embodiments, the one or more production parameters are processing parameters adjusted for producing subsequent wood product from the wood source in relative real time and include: replacing a knife or other processing component; adjusting a rotation speed of a lath turning the wood source; adjusting an angle between a knife used to cut the wood product from the wood source; and adjusting a pressure used to keep a knife used to cut wood product from the wood source in contact with a surface of the wood source.

The disclosed embodiments utilize NIR cameras to scan the surface of a wood product for irregularities and create an NIR image of the surface of the wood product. Since essentially each pixel of camera image data is a sample point, the resolution and accuracy of the surface irregularity detection process is only limited by the number of pixels the camera has covering the field of view, e.g., the entire first surface of a wood product. Consequently, in the case where a 1.3 mega pixel camera is used there are essentially 1,300,000 individual measurement points on the surface of the wood product. In addition, NIR wavelengths are in the range of 750 nanometers (nm) to 3500 nm which are much smaller that the visible wavelengths of 380 to 740 nm. Consequently, the use of NIR cameras as disclosed herein results in resolutions and accuracy that simply cannot be achieved using traditional visual irregularity detection systems.

In addition, when, as disclosed herein, NIR cameras are used as the surface irregularity detection mechanism, if greater or less resolution is deemed necessary, a higher or lower mega-pixel camera can be selected to achieve the desired resolution for the process. This can be accomplished in a relatively simple and quick camera switch out procedure. In addition, NIR camera placement with respect to the sample under analysis can be adjusted such that a quality image can be obtained as long as there is a clear field of view between the wood product surface and NIR camera. Horizontal, vertical, or angled placements have no impact on the functionality of the NIR camera.

Therefore, the disclosed technical solution is capable of detecting irregularities in a wide range of samples sizes ranging from of a traditional 2"×2" square, to a full 4'×8' sheet or panel surface, and, by using a series of NIR images spliced together, up to a 80'-120' ribbon of material. This, in turn, allows the disclosed embodiments to be implemented without significantly slowing down the production process or increasing the cost of the finished wood product.

The use of NIR cameras, as disclosed herein, eliminates the need for any offline magnification of the wood product or the need for the surface irregularity detection device, i.e., the NIR camera, to be close to the surface of a wood product. This allows for more flexible placement of the sample taking device, i.e., the NIR camera.

In addition, unlike visual based detection methods NIR cameras are virtually immune to ambient visible light and interference. Consequently, use of NIR cameras as disclosed herein is far more suitable for a physical production line environment.

Further, NIR technology has been determined to be safe, i.e., representing no hazards to workers or other devices, by several testing and safety agencies. Consequently, the use of the disclosed NIR based surface irregularity detection systems results in a safe, comfortable, and efficient workplace and production floor.

Using the disclosed embodiments, surface irregularities on the surface of wood products can be identified efficiently, effectively, and quickly, while the production line continues operation at normal speeds, consequently, implementation of the disclosed embodiments, does not slow down production speed or change product processing time.

Using the information available from the disclosed embodiments, preconditioning parameters for subsequent wood sources used to produce subsequent wood products can be evaluated and adjusted without slowing down the production line. These preconditioning parameters include the amount of chemical used in a preconditioning liquid used to precondition the wood source; the type of chemical used in a preconditioning liquid used to precondition the wood source; the time the wood source soaks in a preconditioning liquid used to precondition wood source; and the temperature of a preconditioning liquid used to precondition the wood source. Consequently, the disclosed embodiments provide a technical solution to the long-standing technical problem of how to identify the interaction of these preconditioning parameters and adjust the preconditioning process for optimal results before significant amounts of defective wood product have been produced.

In addition, using the information available from the disclosed embodiments, one or more processing parameters can be adjusted and applied to a single wood source as it is being processed into wood product in relative real time. These processing parameters include: replacing a knife or other processing component; adjusting a rotation speed of a lath turning the wood source; adjusting an angle between a knife used to cut the wood product from the wood source; and adjusting a pressure used to keep a knife used to cut wood product from the wood source in contact with a surface of the wood source. Consequently, the disclosed embodiments provide a technical solution to the long-standing technical problem of adjusting processing parameters for optimal results from a single wood source before significant amounts of defective wood product have been produced.

As a result of these and other disclosed features, which are discussed in more detail below, the disclosed embodiments address the short comings of the prior art surface irregularity detection systems and provide an effective and efficient technical solution to the technical problem of accurately and efficiently detecting irregularity levels and locations in a surface of a wood product, such as veneer ribbons, veneer sheets, or other wood products.

BRIEF DESCRIPTION OF THE DRAWINGS

FIG. 1B shows a table of example production parameters and the effect non-optimal production parameters can have on the wood product, e.g., on a resulting veneer ribbon or sheet.

Figure 1A:
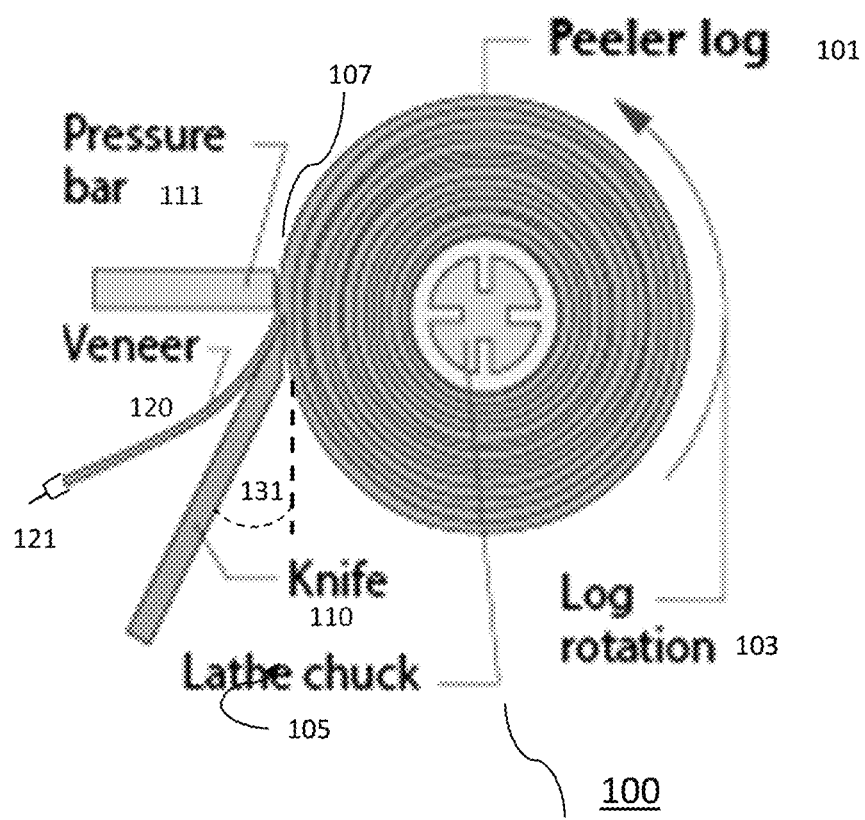
FIG. 1A shows a preconditioned wood source, in this example a peeler log, being processed using rotary cutting methods.

Common reference numerals are used throughout the figures and the detailed description to indicate like elements. One skilled in the art will readily recognize that the above figures are merely illustrative examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, or described below. Rather, these exemplary embodiments are provided to allow a complete disclosure that conveys the principles of the invention, as set forth in the claims, to those of skill in the art.

The disclosed embodiments utilize NIR technology, including NIR cameras and detectors, to accurately identify surface irregularities and the specific locations of the irregularities in wood product surface such as the surface of a veneer ribbon or sheet.

As discussed in more detail below, in one embodiment, this is accomplished by providing a NIR analysis station including one or more illumination sources and one or more NIR cameras. In addition, in some embodiments, visual cameras may be combined to further refine the NIR image based on physical features such as knots that impact veneer ribbon peel quality, or thermal cameras that show temperature variations in the material temperature that impacts veneer ribbon peel quality peel quality.

A wood product, such as a veneer ribbon or sheet is then positioned in, and/or is passed through, the NIR analysis station. At the NIR analysis station an entire first surface of the wood product to be analyzed is illuminated by the one or more illumination sources and the one or more NIR cameras are used to capture one or more NIR images of the illuminated surface of the wood product.

The one or more NIR images of entire surface of the wood product are then analyzed and irregularity levels over the first surface of the wood product are identified. In one example, this is accomplished with the aid of a surface irregularity level to greyscale mapping database containing empirical data. In another embodiment, this is accomplished using the surface irregularity level to greyscale mapping database and a greyscale to color mapping database. In another embodiment, this is accomplished using one or more machine learning based models.

Once the irregularity levels over the first surface of the wood product are identified, a grade is assigned to the wood product based on the identified irregularity levels for the wood product and based, at least in part, on the grade assigned to the wood product, one or more actions are taken with respect to the wood product.

The one or more actions can include one or more of: sorting the wood product into a bin or location associated with the grade assigned to the wood product; restricting the use of the wood product based on grade assigned to the wood product; rejecting the wood product based on the grade assigned to the wood product; sending the wood product back for further processing based on the grade assigned to the wood product; adjusting one or more processing parameters of a production line based on grades assigned to one or more wood products; adjusting preconditioning parameters on a production line based on grades assigned to one or more wood products; and adjusting one or more wood product cutting parameters on a production line based on grades assigned to one or more wood products.

Consequently, disclosed herein is an effective and efficient technical solution to the technical problem of accurately and efficiently detecting irregularity levels and irregularity locations on a surface of a wood product, such as veneer sheets or veneer ribbons. In addition, in various embodiments, the disclosed NIR cameras to can take NIR images or wood product surface ranging from 2"×2", to a full 4'×8' sheet or panel surface, to an 80'-120' by splicing a series of images together. Consequently, the disclosed technical solution is capable of accurately analyzing an entire surface of a wood product, such as a veneer sheet, and can be implemented without significantly slowing down the production process or increasing the cost of the finished wood product.

Figure 3A:
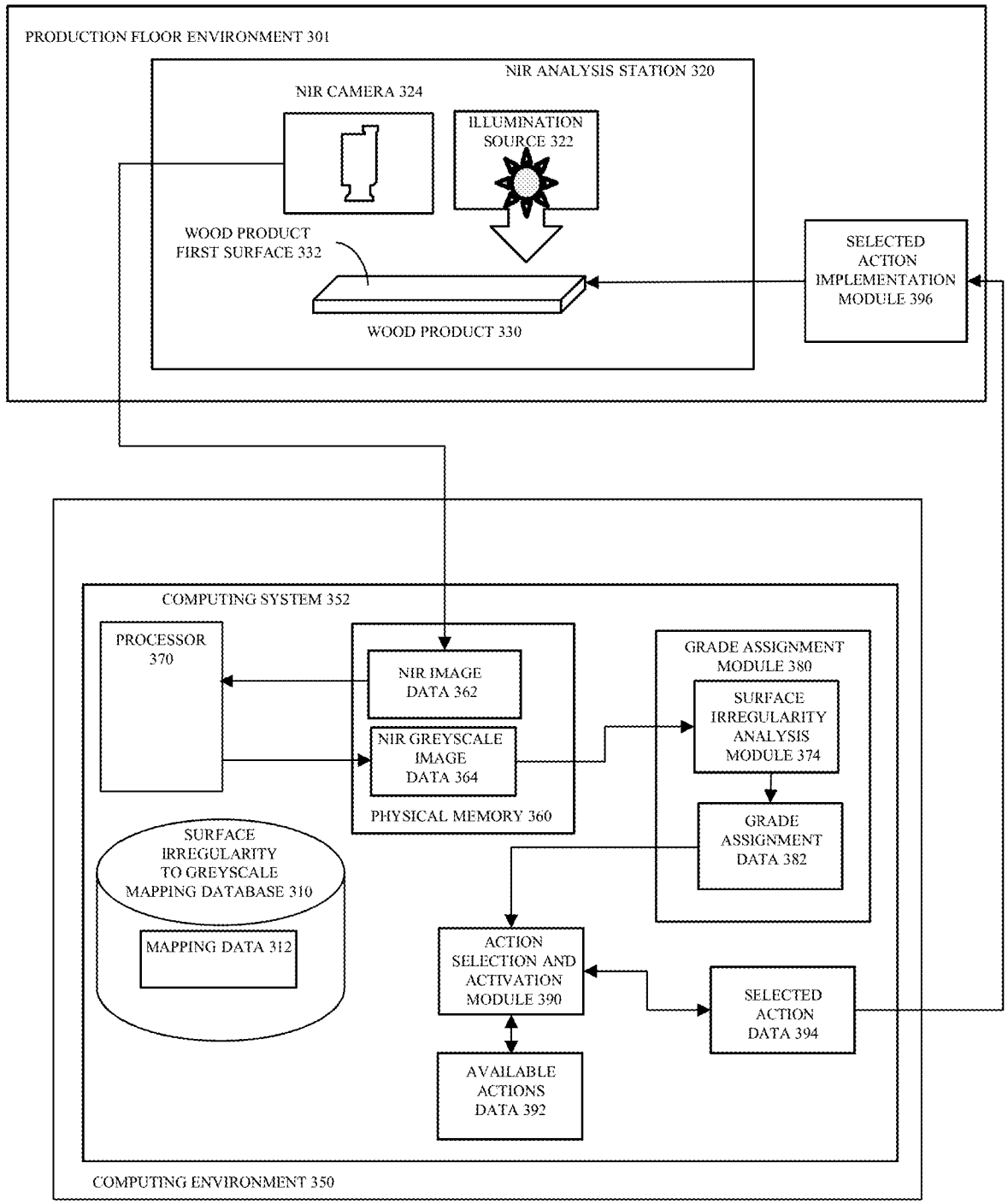
FIG. 3A is simplified block diagram of a system for detecting surface irregularity levels in a wood product using NIR technology in accordance with one embodiment.

FIG. 3A is simplified block diagram of one embodiment of a system 300 for detecting surface irregularity levels in a wood product using NIR technology in accordance with one embodiment.

In one embodiment, system 300 includes a production floor environment 301 and a computing environment 350.

As seen in FIG. 3A, production floor environment 301 includes NIR analysis station 320 and selected action implementation module 396. As seen in FIG. 3A, NIR analysis station 320 includes one or more illumination sources, such as illumination source 322, positioned to illuminate a surface of a wood product. In various embodiments, the one or more illumination sources, such as illumination source 322, can include one or more LED light sources. In other embodiments, the one or more illumination sources, such as illumination source 322, can include, but are not limited to, halogen, halogen and tungsten light sources, or any other light sources, as discussed herein, and/or as known in the art at the time of filing, and/or as developed after the time of filing.

As seen in FIG. 3A, NIR analysis station 320 also includes one or more NIR cameras, such as NIR camera 324, positioned to capture NIR image data 362 representing one or more NIR images of the illuminated surface of the wood product. In one embodiment, the one or more NIR cameras, such as NIR camera 324, are adjustably positioned and adjustably focused to capture any desired one or more NIR images of the illuminated surface of the wood product.

As used herein, the terms Near InfraRed (NIR) and Short-Wave InfraRed (SWIR) are used interchangeably to include wavelengths in the range of 750 nanometers (nm) to 3500 nm. In addition, all stated wave lengths herein are assumed to include values within 10% of the stated value. NIR wavelengths are in the range of 750 nanometers (nm) to 3500 nm which are much smaller that the visible wavelengths of 380 to 740 nm. Consequently, the use of NIR cameras as disclosed herein results in resolutions and accuracy that simply cannot be achieved using traditional visual irregularity detection systems.

As seen in FIG. 3A, and as discussed below, a wood product 330 to be analyzed in the NIR analysis station 320 is positioned in NIR analysis station 320. In various embodiments, the wood product 330 can be any wood product as discussed herein, and/or as known in the art at the time of filing and/or as becomes known after the time of filing. In one embodiment, the wood product 330 to be analyzed is a veneer ribbon or sheet.

In one embodiment, the wood product 330 to be analyzed is positioned such that a wood product first surface 332 of the wood product 330 to be analyzed is illuminated by the illumination source 322 and a sample portion of the wood product first surface 332 is within view and focus of NIR camera 324. In one embodiment, the wood product 330 is positioned in the NIR analysis station 320 by passing the wood product 330 through the NIR analysis station 320 on a conveyor system.

In various embodiments, the one or more NIR cameras, such as NIR camera 324, can be of any resolution desired. As noted above, when the one or more NIR cameras, such as NIR camera 324, are used to scan the wood product first surface 332 of a wood product 330 for irregularities and create an NIR image data 362 of the wood product first surface 332, essentially each pixel generated by NIR camera 324 is a sample point. Consequently, the resolution and accuracy of the surface irregularity detection process is only limited by the number of pixels the NIR camera 324 has covering the field of view, e.g., the entire wood product first surface 332 of wood product 330. Consequently, in the case where NIR camera 324 is a 1.3 mega pixel camera, there are essentially 1,300,000 individual measurement points on the wood product first surface 332. In addition, NIR wavelengths are in the range of 750 nanometers (nm) to 3500 nm which are much smaller that the visible wavelengths of 380 to 740 nm. Consequently, the use of NIR cameras as disclosed herein results in resolutions and accuracy that simply cannot be achieved using traditional visual irregularity detection systems. Consequently, using NIR cameras, such as NIR camera 324, results in resolutions and accuracy that simply cannot be achieved using traditional surface magnified visual image methods.

Therefore, using NIR cameras, such as NIR camera 324, system 300 is capable of detecting irregularities in a wide range of samples sizes ranging from of a traditional 2"×2" square, to a full 4'×8' sheet or panel surface, and, by using a series of NIR images spliced together, up to a 80'-120' ribbon of material. This, in turn, allows the disclosed embodiments to be implemented without significantly slowing down the production process or increasing the cost of the finished wood product.

As seen in FIG. 3A, computing environment 350 includes computing system 352. As seen in FIG. 3A, in one embodiment, computing system 352 includes surface irregularity to greyscale mapping database 310 containing mapping data 312 that maps surface irregularities to Near InfraRed (NIR) image greyscale values for one or more wood products.

Using NIR images, extremely granular differences in irregularity levels can be detected. In general, locations with different levels of irregularities absorb/reflect different amounts of NIR radiation at specific frequencies. In operation, when NIR radiation of a given frequency is applied to a wood product first surface 332 of wood product 330, more NIR energy is reflected from surfaces that are perpendicular the NIR camera lens. Consequently, locations having irregularities such that the surfaces are not perpendicular the NIR camera lens will appear darker, i.e., have a greater greyscale value.

When the NIR camera 324 takes an image of the wood product first surface 332, the NIR camera 324 picks up the NIR energy reflected off wood product first surface 332 at angles of about 90 degrees, i.e., that are reflected substantially perpendicular to wood product first surface 332. Consequently, when the NIR camera 324 takes an image of the wood product first surface 332, the areas of irregularities, which scatter NIR energy at various angles other than 90 degrees and therefore reflect less NIR energy at the desired angles of about 90 degrees, appear darker than less textured areas. In addition, the higher or more significant the irregularities that are present, the darker the area appears because less NIR energy is reflected at angles of about 90 degrees to be captured by the NIR camera 324.

Using this fact, NIR image data 362 captured by the NIR camera 324 can be processed into NIR greyscale image data 364. Greyscale images can be of varying resolution, or bit, types. A 16-bit integer greyscale image provides 65535 available tonal steps from 0 (black) to 65535 (white). A 32-bit integer greyscale image theoretically will provide 4,294,967,295 tonal steps from 0 (black) to 4294967295 (white). Converting an NIR image based on these numbers of greyscale tonal steps results in a margin of error of significantly less than 0.1%.

In some embodiments, two or more illumination sources, such as illumination source 322, are utilized, that are positioned a different angles with respect to wood product first surface 332. This allows different types and levels of irregularities to be detected. In addition, using two or more two or more illumination sources, such as illumination source 322, that are positioned at different angles means that different irregularities will have surfaces perpendicular to the camera lens and therefore will yield a 3-D effect when a composite NIR image is constructed.

Likewise, in some embodiments, two or more NIR cameras are utilized, such as NIR camera 324, that are operated at different NIR frequencies and/or that are positioned a different angles with respect to wood product first surface 332. This allows different types and levels of irregularities to be detected. In addition, using two or more NIR cameras, such as NIR camera 324, that are positioned at different angles means that different irregularities will have surfaces perpendicular to the camera lens and therefore will yield a 3-D effect when a composite NIR image is constructed.

Figure 3B:
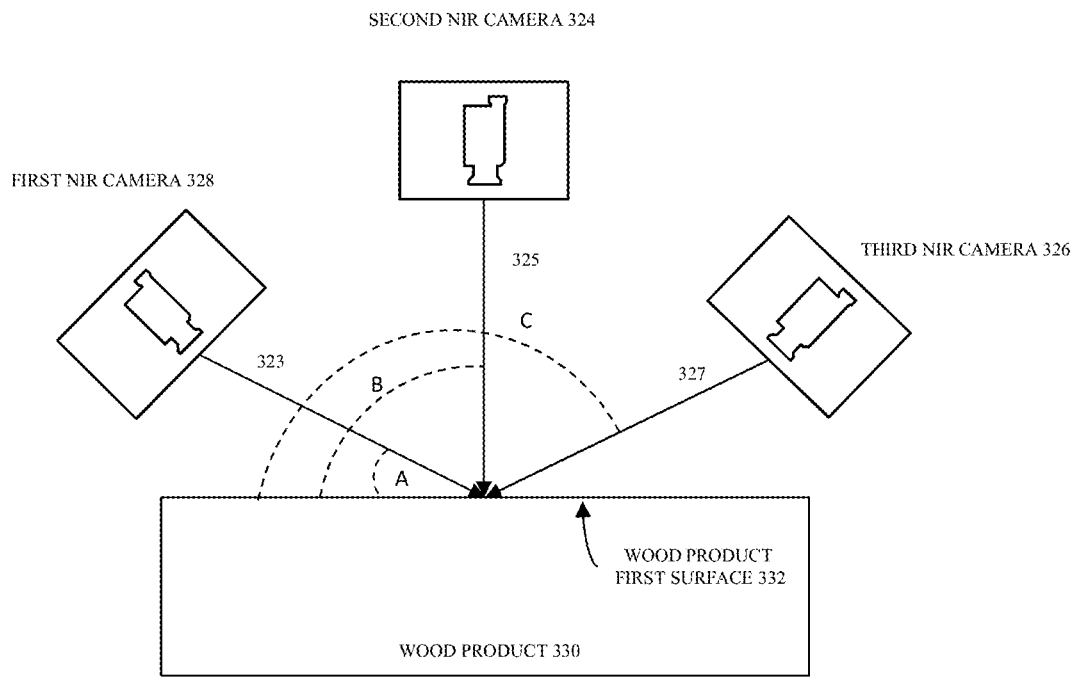
FIG. 3B is simplified block diagram of a system for detecting surface irregularity levels in a wood product using three NIR cameras in accordance with one embodiment.

FIG. 3B shows an end view of wood product 330 positioned in an NIR analysis station including three NIR cameras 328, 324, and 326. As seen in FIG. 3B, first NIR camera 328 is positioned such that line 323 from a lens of first NIR camera 328 is at an angle "A" with respect to wood product first surface 332. Similarly, second NIR camera 324 is positioned such that line 325 from a lens of second NIR camera 324 is at an angle "B" with respect to wood product first surface 332. Likewise, third NIR camera 326 is positioned such that line 327 from a lens of third NIR camera 326 is at an angle "C" with respect to wood product first surface 332.

In some embodiments, each of NIR cameras 328, 324, and 326 can be operated at different NIR frequencies and, as seen in FIG. 3B, are positioned a different angles A, B, and C, respectively, with respect to wood product first surface 332. In one embodiment, angle A is 45 degrees, angle B is 90 degrees, and angle C is 135 degrees. As noted, the arrangement shown in FIG. 3B allows different types and levels of irregularities to be detected. In addition, using two or more NIR cameras, such as NIR cameras 328, 324, and 326, that are positioned a different angles means that different irregularities will have surfaces perpendicular to the camera lens and therefore will yield a 3-D-like effect when a composite NIR image is constructed.

As noted above, in some embodiments, two or more illumination sources, such as illumination source 322, are utilized, that are positioned a different angles with respect to wood product first surface 332. This allows different types and levels of irregularities to be detected. In addition, using two or more two or more illumination sources, such as illumination source 322, that are positioned at different angles means that different irregularities will have surfaces perpendicular to the camera lens and therefore will yield a 3-D effect when a composite NIR image is constructed.

Consequently, in some embodiments, in an arrangement similar to FIG. 3B, a first illumination source can positioned such that line from the first illumination source is at an angle "A" with respect to wood product first surface, a second illumination source can positioned such that line from the second illumination source is at an angle "B" with respect to wood product first surface, and a third illumination source can positioned such that line from the third illumination source is at an angle "C" with respect to wood product first surface. As discussed above, in some embodiments, angles A, B, and C, respectively, with respect to wood product first surface are all different and, in one very specific embodiment, angle A is 45 degrees, angle B is 90 degrees, and angle C is 135 degrees.

In addition, as discussed in the disclosed related applications, in some embodiments, visual cameras may be combined to further refine the NIR image based on physical features such as knots that impact veneer ribbon peel quality, or thermal cameras that show temperature variations in the material temperature that impacts veneer ribbon peel quality peel quality.

Returning to FIG. 3A, using the concepts discussed above, the mapping data 312 of surface irregularity to greyscale mapping database 310 is obtained through one or more empirical and/or manual processes.

For instance, in one embodiment, sample wood products that have been identified and associated with one or more production parameter values can be passed through NIR analysis station 320 and known production parameter NIR images can be obtained for numerous sample wood products determined to be produced by known production parameters.

FIGS. 4A to 4F are illustrative examples of NIR images of surfaces of veneer ribbons produced under various optimal and non-optimal production parameters. In the specific examples of FIGS. 4A to 4F the NIR image illustrations of 4A, 4B, 4C, 4D, 4E and 4F, correlate to the magnified visual image illustrations of FIGS. 2A, 2B, 2C, 2D, 2E and 2F, respectively.

Figure 4A:
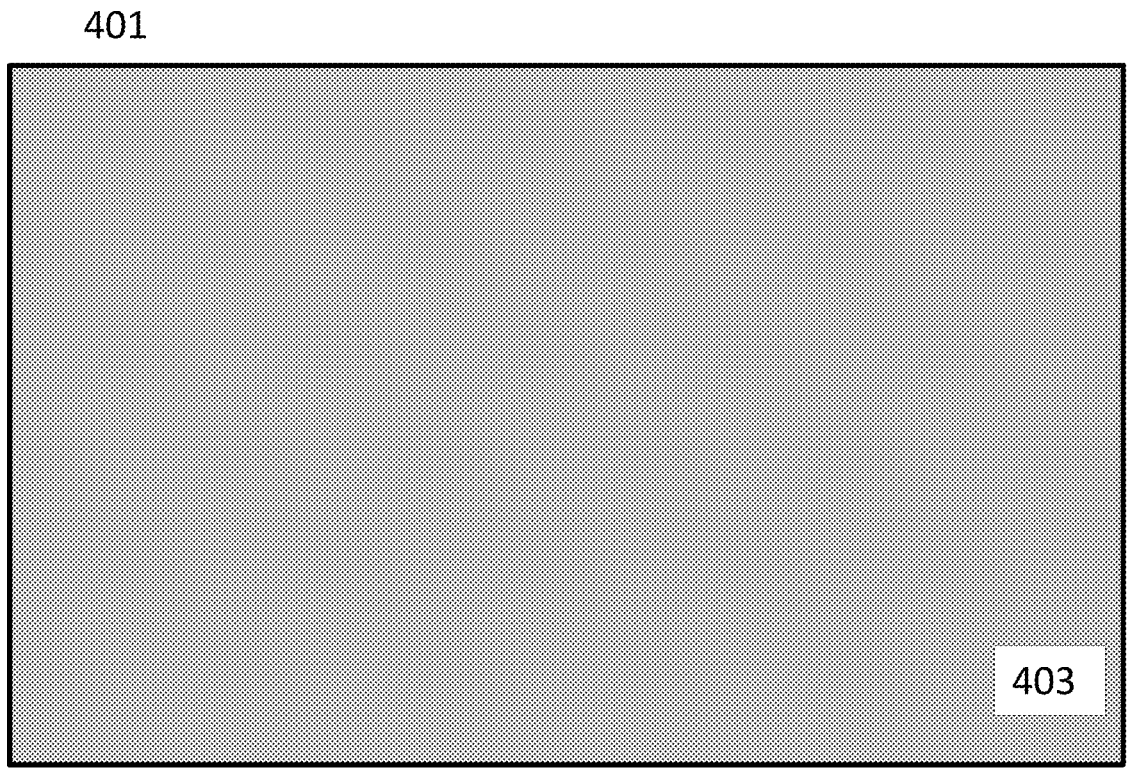
FIG. 4A is a representation of an NIR image of the surface of a veneer ribbon or sheet that was produced from an optimally preconditioned conditioned log.
Figure 4B:
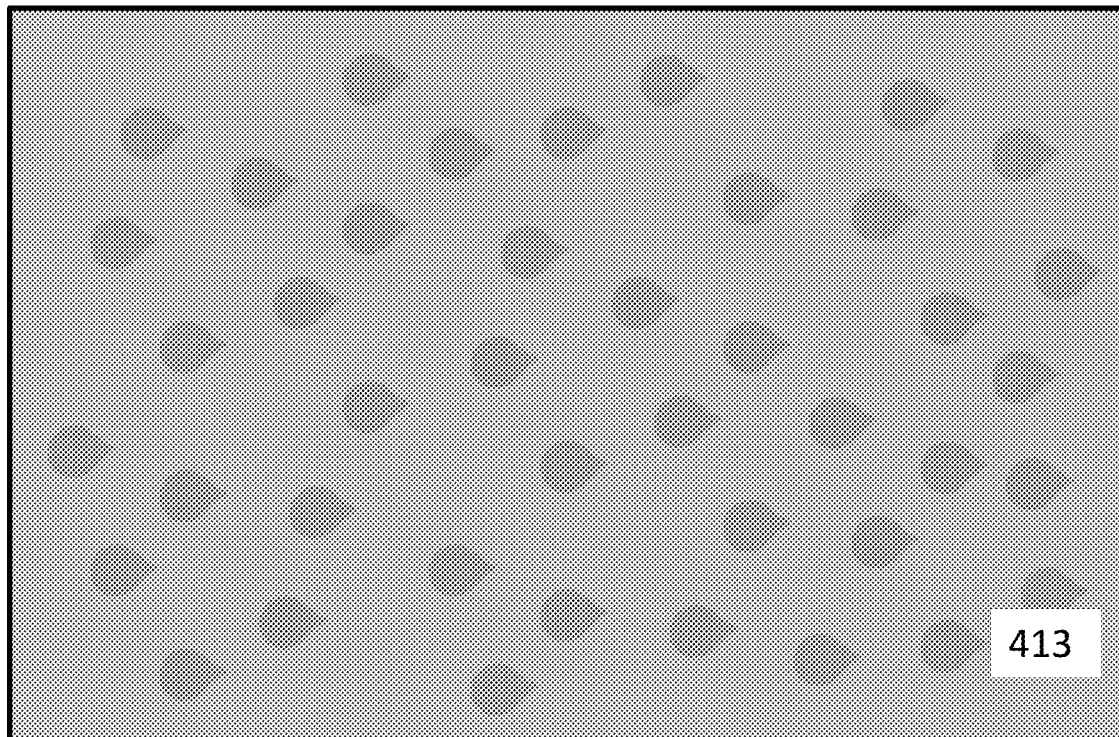
FIG. 4B is a representation of an NIR image of the surface of a veneer ribbon or sheet that was produced from an over preconditioned log.
Figure 4C:
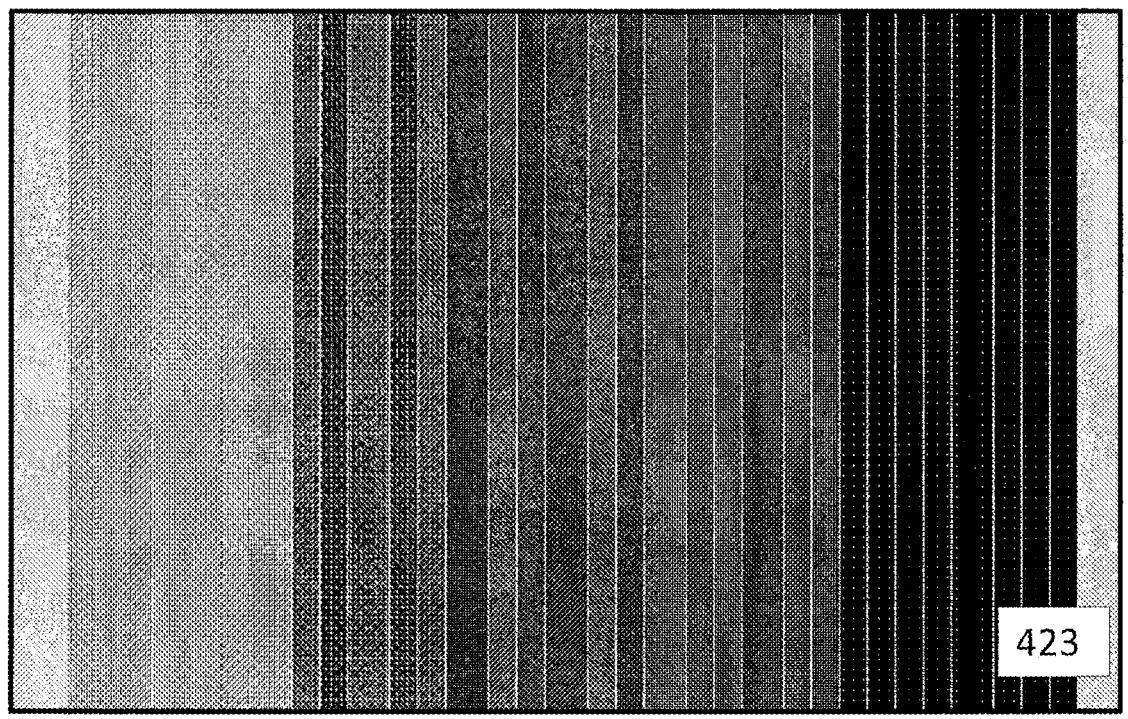
FIG. 4C is a representation of an NIR image of the surface of a veneer ribbon or sheet that was produced from an under preconditioned log.
Figure 4D:
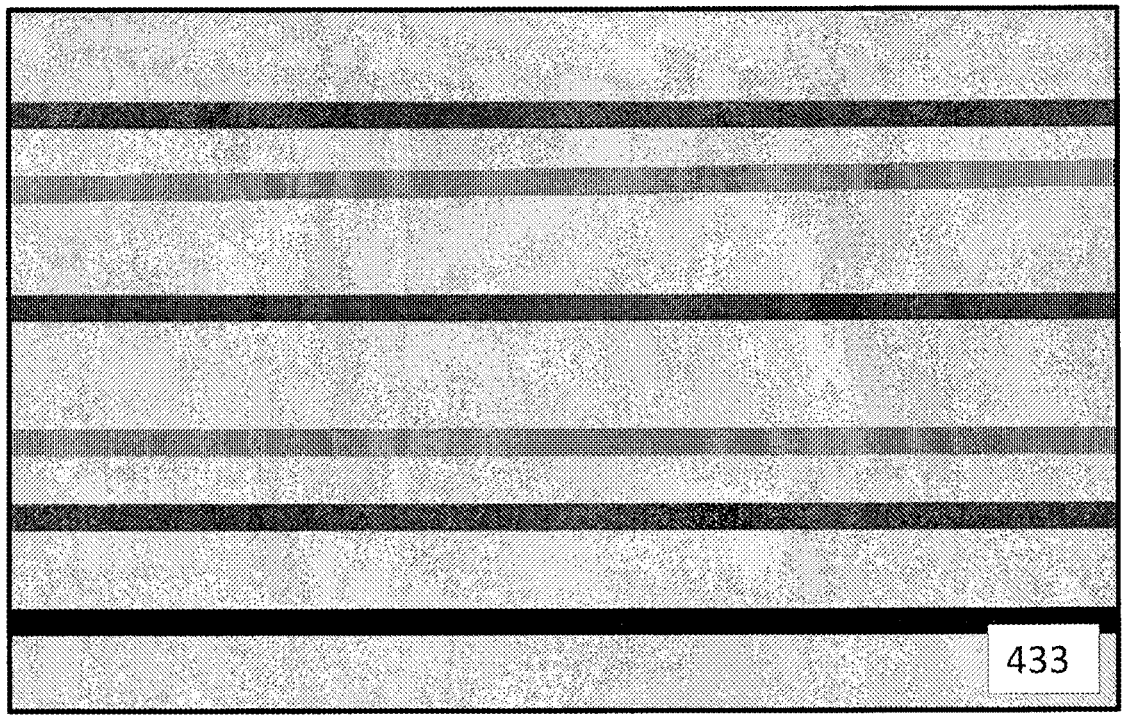
FIG. 4D is a representation of an NIR image of the surface of a veneer ribbon or sheet that was produced under conditions where the cutting knife edge was irregular, nicked, or otherwise damaged.
Figure 4E:
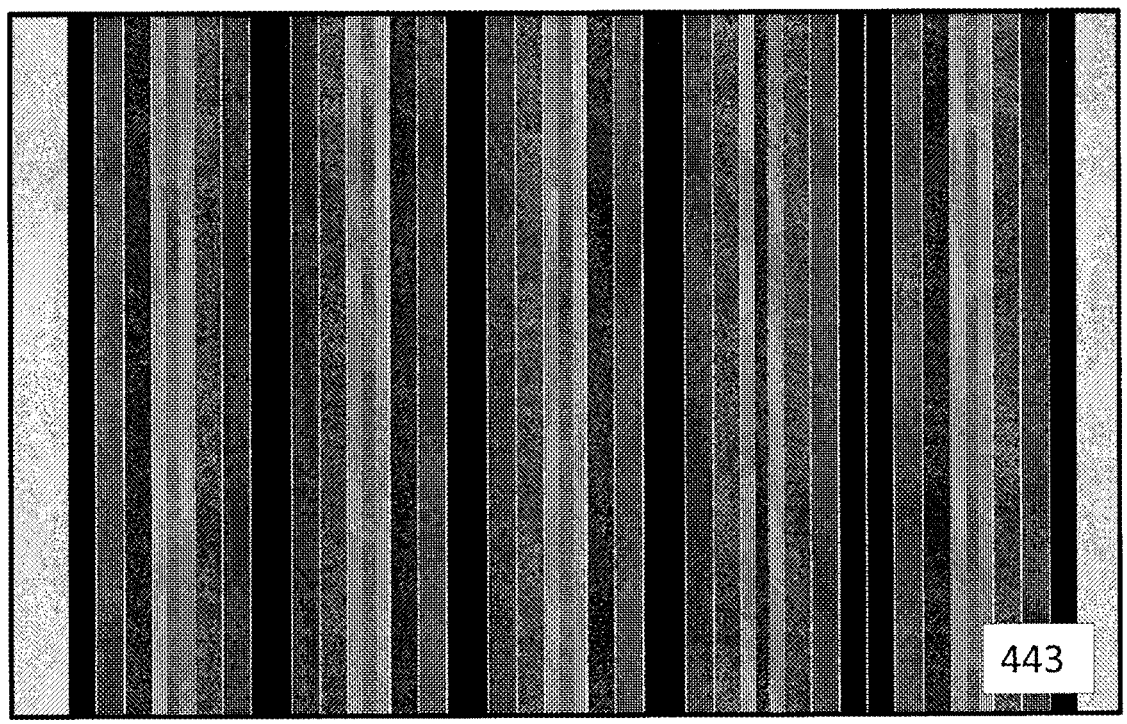
FIG. 4E is a representation of an NIR image of the surface of a veneer ribbon or sheet that was produced under conditions where the cutting knife edge was not held against the surface of the preconditioned log with a steady pressure.
Figure 4F:
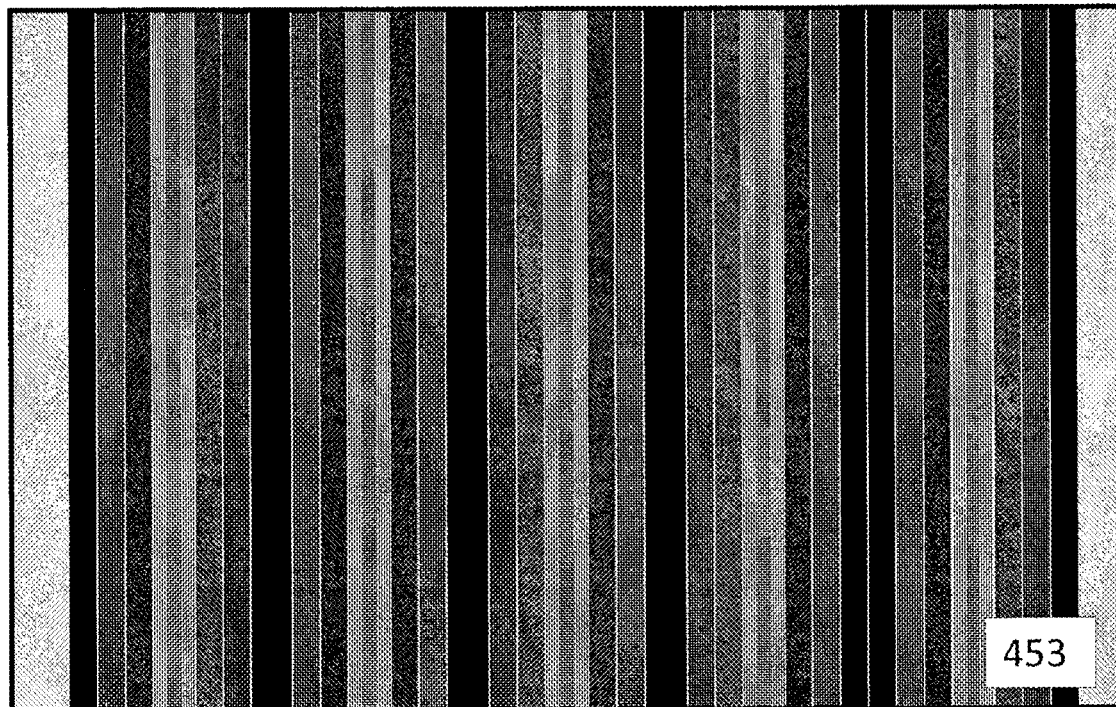
FIG. 4F is a representation of an NIR image of the surface of a veneer ribbon or sheet that was produced under conditions where the cutting knife was dull.

Consequently, FIG. 4A is a representation of an NIR image of the surface of a veneer ribbon or sheet that was produced from an optimally preconditioned conditioned log, FIG. 4B is a representation of an NIR image of the surface of a veneer ribbon or sheet that was produced from an over preconditioned log, FIG. 4C is a representation of an NIR image of the surface of a veneer ribbon or sheet that was produced from an under preconditioned log, FIG. 4D is a representation of an NIR image of the surface of a veneer ribbon or sheet that was produced under conditions where the cutting knife edge was irregular, nicked, or otherwise damaged, FIG. 4E is a representation of an NIR image of the surface of a veneer ribbon or sheet that was produced under conditions where the cutting knife edge was not held against the surface of the preconditioned log with a steady pressure, and FIG. 4F is a representation of an NIR image of the surface of a veneer ribbon or sheet that was produced under conditions where the cutting knife was dull.

Figure 2A:
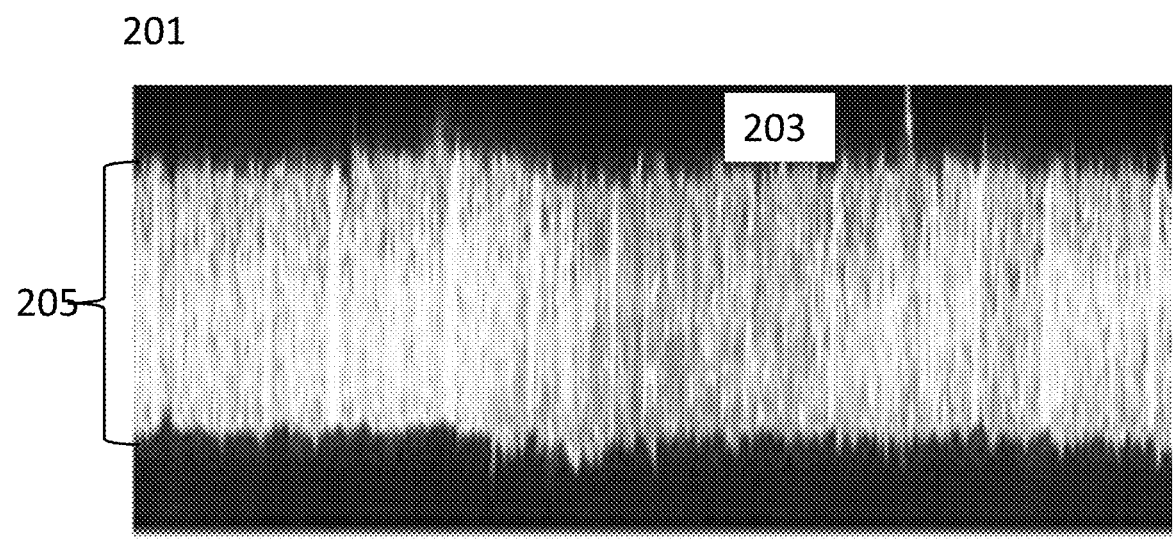
FIG. 2A is a representation of a magnified side view of a surface of a veneer ribbon or sheet that was produced from an optimally preconditioned conditioned log.

Therefore, in the specific illustrative examples of FIGS. 2A and 4A, sample wood products determined empirically to be produced from optimally preconditioned wood sources, such as shown in FIG. 2A, can be passed through NIR analysis station 320 to generate known optimally preconditioned wood NIR images of surface 403 of veneer ribbon 401, as shown in FIG. 4A.

Figure 2B:
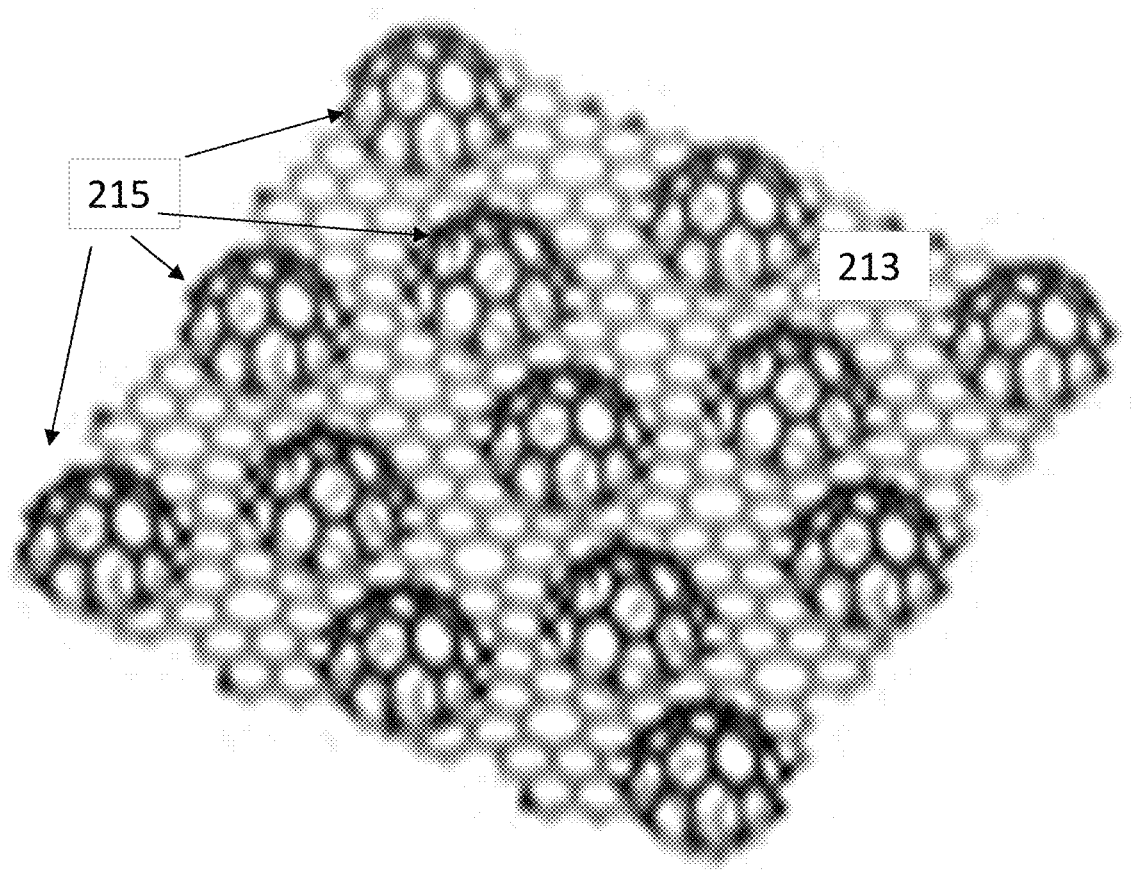
FIG. 2B is a representation of a magnified surface of a veneer ribbon or sheet that was produced from an over preconditioned log.

Similarly, in the specific illustrative examples of FIGS. 2B and 4B, sample wood products determined empirically to be produced from over preconditioned wood sources, such as shown in FIG. 2B, can be passed through NIR analysis station 320 to generate known over preconditioned wood NIR images of surface 413 of veneer ribbon 411, as shown in FIG. 4B.

Figure 2C:
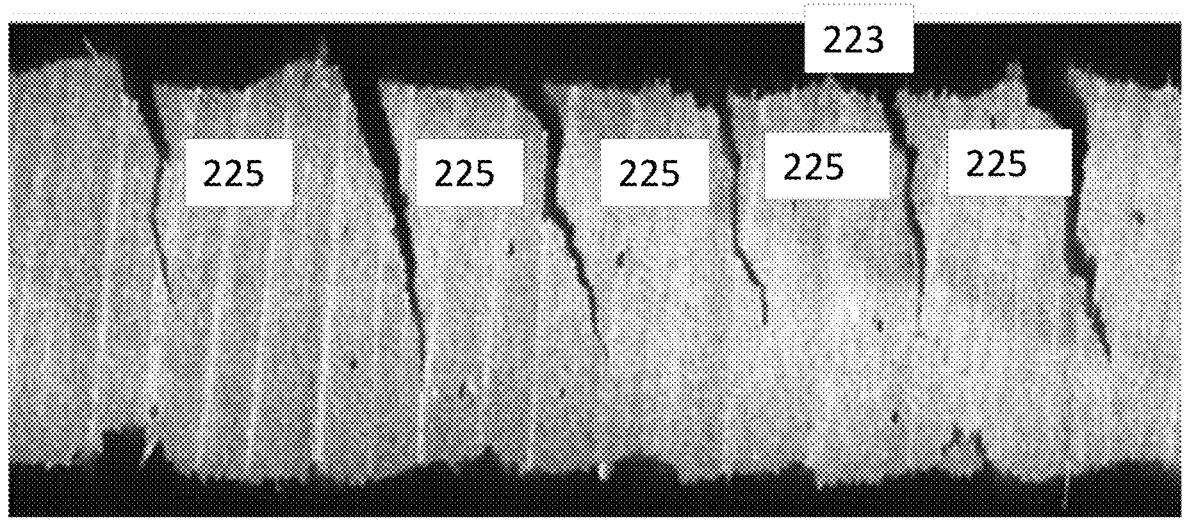
FIG. 2C is a representation of a magnified side view of a surface of a veneer ribbon or sheet that was produced from an under preconditioned log.

Similarly, in the specific illustrative examples of FIGS. 2C and 4C, sample wood products determined empirically to be produced from under preconditioned wood sources, such as shown in FIG. 2C, can be passed through NIR analysis station 320 to generate known under preconditioned wood NIR images of surface 423 of veneer ribbon 421, as shown in FIG. 4C.

Figure 2D:
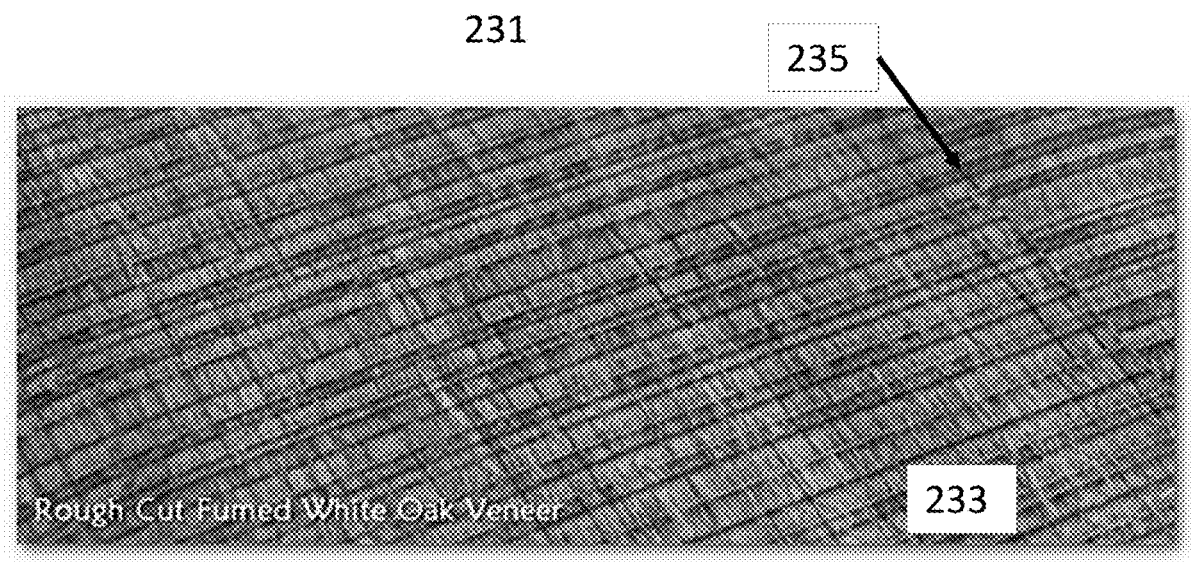
FIG. 2D is a representation of a magnified view of a surface of a veneer ribbon or sheet that was produced under conditions where the cutting knife edge was irregular, nicked, or otherwise damaged.

Likewise, in the specific illustrative examples of FIGS. 2D and 4D, sample wood products determined empirically to be produced under conditions where the cutting knife edge was irregular, nicked, or otherwise damaged, such as shown in FIG. 2D, can be passed through NIR analysis station 320 to generate known irregular cutting knife edge NIR images of surface 433 of veneer ribbon 431, as shown in FIG. 4D.

Figure 2E:
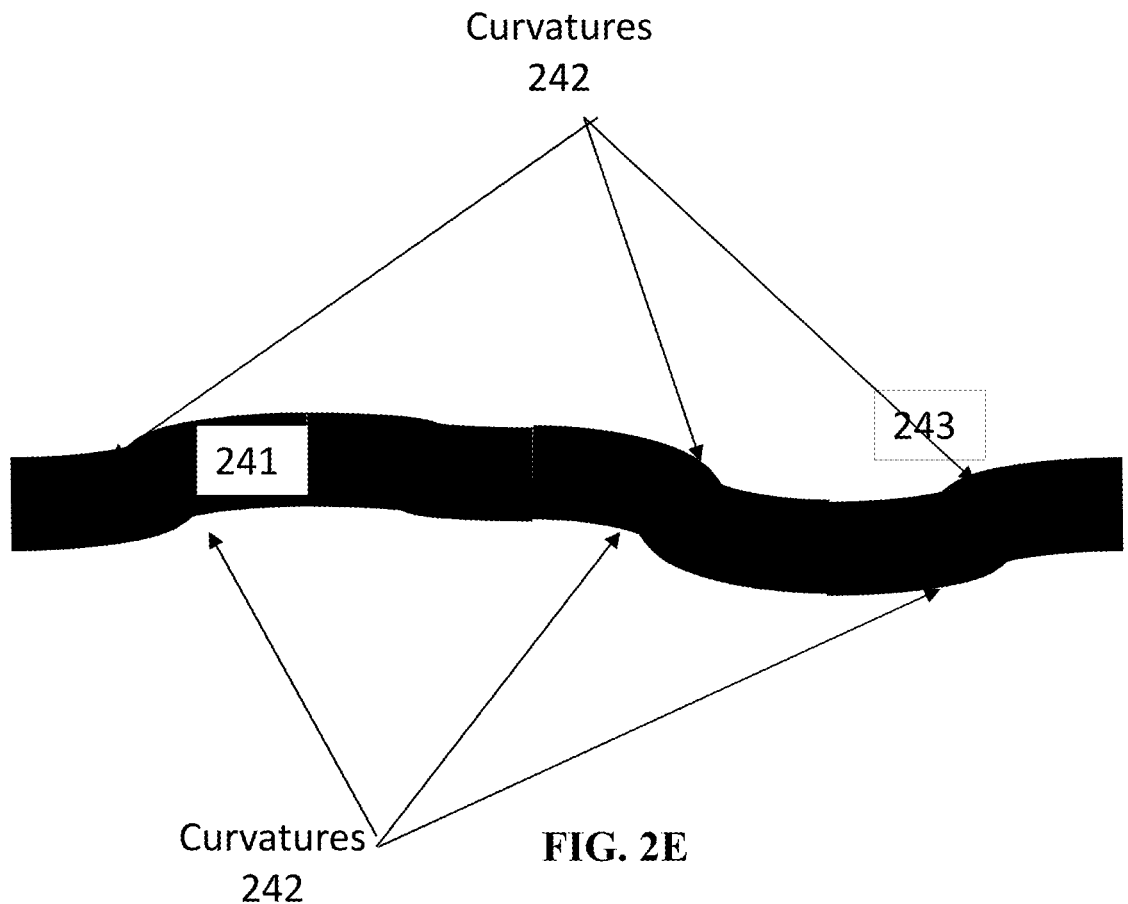
FIG. 2E is a representation of a magnified side view of a surface of a veneer ribbon or sheet that was produced under conditions where the cutting knife edge was not held against the surface of the preconditioned log with a steady pressure.

Likewise, in the specific illustrative examples of FIGS. 2E and 4E, sample wood products determined empirically to be produced under conditions where the cutting knife edge was not held against the surface of the preconditioned log with a steady pressure, such as shown in FIG. 2E, can be passed through NIR analysis station 320 to generate known irregular cutting knife pressure NIR images of surface 443 of veneer ribbon 441, as shown in FIG. 4E.

Figure 2F:
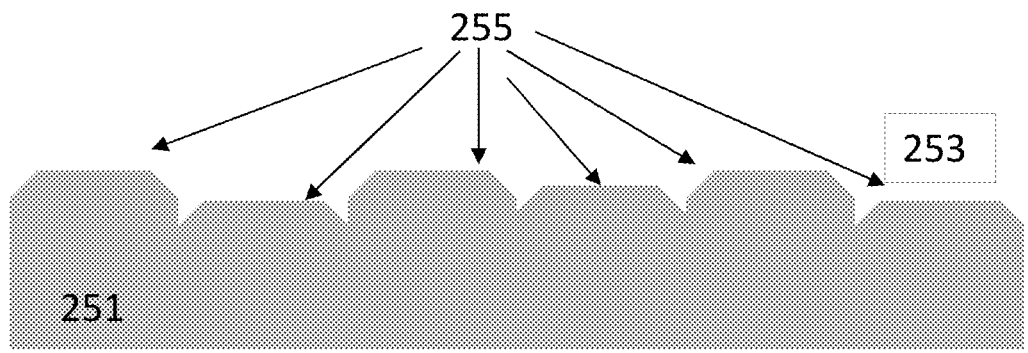
FIG. 2F is a representation of a magnified side view of a surface of a veneer ribbon or sheet that was produced under conditions where the cutting knife was dull.

Similarly, in the specific illustrative examples of FIGS. 2F and 4F, sample wood products determined empirically to be produced under conditions where the cutting knife edge was dull, such as shown in FIG. 2F, can be passed through NIR analysis station 320 to generate known dull cutting knife NIR images of surface 453 of veneer ribbon 451, as shown in FIG. 4F.

This process is continued for multiple levels and types of surface irregularities and greyscale data for each irregularity increment is determined and correlated to the respective surface irregularities increment. In this way, mapping data 312 mapping each specific surface irregularities to specific greyscale values is generated for wood products. The process can then be repeated for different wood products, different types of wood, and under varying parameters and conditions. Consequently, the specific examples discussed herein are but illustrative examples and do not limit the scope of the invention as set forth in the claims below.

Returning the FIG. 3A, computing system 352 also includes physical memory 360. In one embodiment, the physical memory 360 includes NIR image data 362 representing one or more NIR images of the illuminated wood product first surface 332 of the wood product 330 captured using NIR camera 324.

As seen in FIG. 3A, in one embodiment, computing system 352 includes one or more processors 370 for processing the NIR image data representing one or more NIR images of the illuminated wood product first surface 332 of the wood product 330 to generate NIR greyscale image data 364 indicating different irregularity levels in the illuminated wood product first surface 332 of the wood product 330.

In one embodiment, processor 370 processes the NIR greyscale image data 364 using the mapping data 312 from surface irregularity to greyscale mapping database 310 to identify irregularity levels for the wood product first surface 332 of the wood product 330.

As seen in FIG. 3A, in one embodiment, computing system 352 includes a grade assignment module 380 for assigning a grade to the wood product 330 based on the identified irregularity levels for the wood product first surface 332. As seen in FIG. 3A, grade assignment module 380 includes surface irregularity analysis module 374 which, along with processor 370, processes the NIR greyscale image data 364 using the mapping data 312 from surface irregularity to greyscale mapping database 310 data to identify irregularity levels for the wood product first surface 332 of the wood product 330. As a result of the processing by irregularities analysis module 374 and processor 370, grade assignment data 382 is generated.

As seen in FIG. 3A, in one embodiment, grade assignment data 382 is provided to action selection and activation module 390 which selects an appropriate action of the actions represented in available actions data 392 based, at least in part on the grade indicated by grade assignment data 382. As seen in FIG. 3A, in one embodiment, the determined appropriate action is represented by selected action data 394.

As seen in FIG. 3A, in one embodiment, selected action data 394 is forwarded to an action activation module, such as selected action implementation module 396, in production floor environment 301 to initialize one or more actions with respect to the wood product 330 based, at least in part, on the grade represented by grade assignment data 382 and assigned to the wood product 330 by action selection and activation module 390.

In one embodiment, one or more actions that can be taken represented in available actions data 392 include, but are not limited to: sorting wood product 330 into a bin or location based, at least in part, on the grade represented by grade assignment data 382 and assigned to the wood product 330; restricting the use of the wood product 330 based on the grade represented by grade assignment data 382 assigned to wood product 330; rejecting the wood product 330 based, at least in part, on the grade represented by grade assignment data 382 and assigned to the wood product 330; sending the wood product 330 back for further processing based, at least in part, on the grade represented by grade assignment data 382 and assigned to the wood product 330; adjusting one or more processing parameters of a production line based, at least in part, on the grade represented by grade assignment data 382 and assigned to the wood product 330 and one or more similarly graded similar wood products; adjusting one or more preconditioning parameters on a production line based, at least in part, on the grade represented by grade assignment data 382 and assigned to the wood product 330 and/or one or more similarly graded wood products; adjusting one or more wood product cutting parameters on a production line based, at least in part, on the grade represented by grade assignment data 382 and assigned to the wood product 330 and/or one or more similarly graded wood products; and selecting a type and amount of glue used on a production line in production floor environment 301 based, at least in part, on the grade represented by grade assignment data 382 and assigned to the wood product 330 and/or the grades assigned other wood products.

As a specific illustrative example a signal representing a grade assigned to the wood product 330 and/or the grades assigned other wood products can be provided to a wood product gluing station (not shown) in a production line so that a glue appropriate to adhere wood products having the assigned grade can be selected and made available to glue the wood product when it reaches the gluing station.

Those of skill in the art will ready recognize that the specific illustrative examples of one embodiment of a production floor environment 301 and components shown in FIGS. 3A and 3B are but specific examples of numerous possible production environments and arrangement of physical components. Consequently, the specific illustrative example of embodiments of a production floor environment 301 and components shown in FIGS. 3A and 3B is not intended to limit the scope of the invention as set forth in the claims below.

Likewise, those of skill in the art will ready recognize that the specific illustrative examples of one embodiment of FIGS. 2A through 2F and corresponding FIGS. 4A through 4F are but specific examples of numerous possible images. Consequently, the specific illustrative examples of one embodiment shown in FIGS. 2A through 2F and corresponding FIGS. 4A through 4F are not intended to limit the scope of the invention as set forth in the claims below.

As a specific illustrative example of potential variations, in various embodiments, the NIR analysis station 320 can include one or more illumination sources 322 positioned to illuminate two or more surfaces of a wood product and one or more NIR cameras 324 positioned to capture one or more NIR images of the two or more illuminated surfaces of the wood product.

As a further specific illustrative example of variations possible, additional input data can be considered such as current ambient temperature and humidity. The combination of these parameters can be analyzed by an Artificial Intelligence/Machine Learning (AI/ML) algorithm to further refine the production parameters for overall process efficiency.

These and numerous other variations are possible and contemplated by the inventors to be within the scope of the invention as set forth in the claims below.

Figure 5:
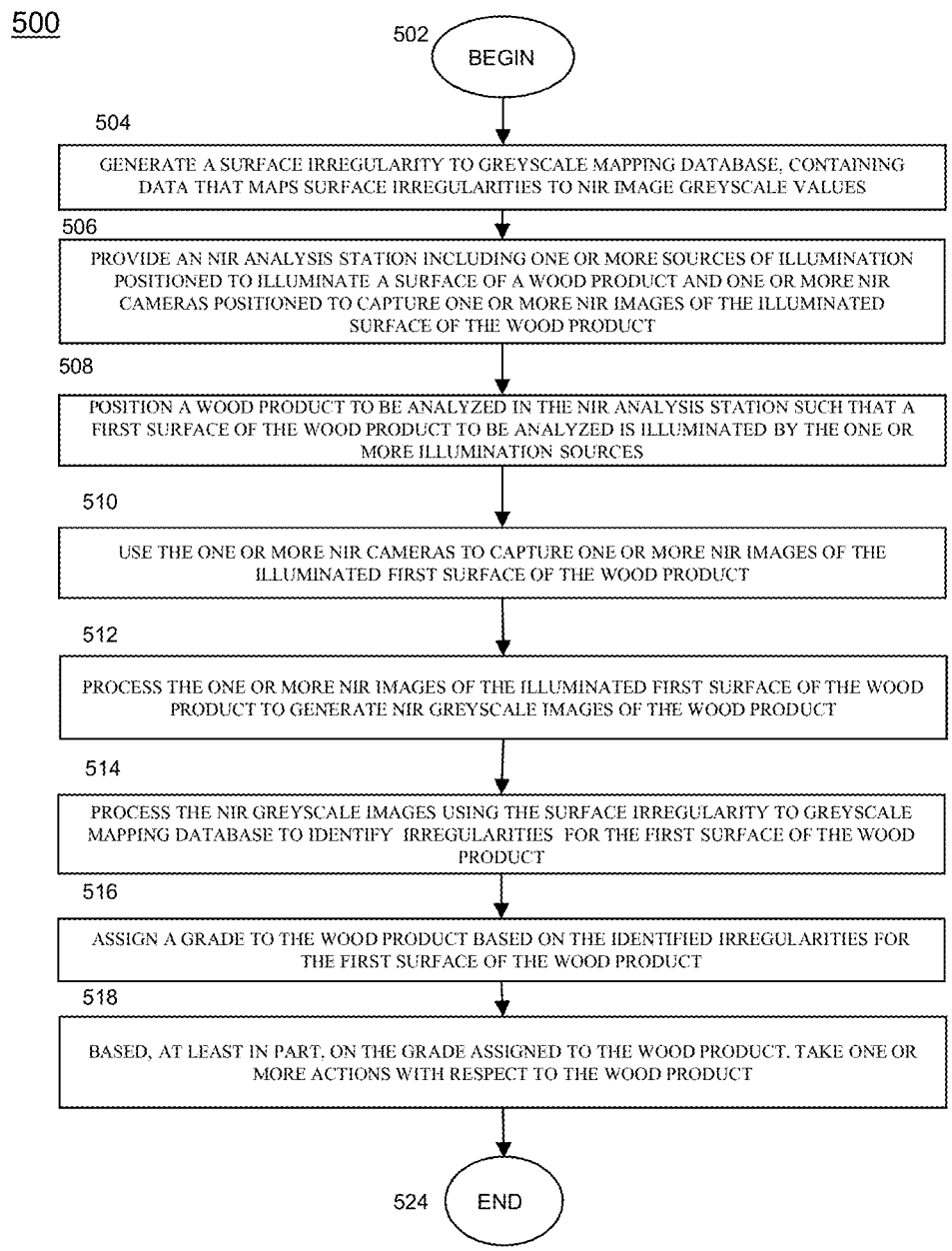
FIG. 5 is flow chart of a process for detecting surface irregularity levels in a wood product using NIR technology in accordance with one embodiment.

FIG. 5 is flow chart of a process 500 for detecting surface irregularity levels in a wood product using NIR technology in accordance with one embodiment.

As seen in FIG. 5, process 500 begins at BEGIN operation 502 and then process proceeds to operation 504. In one embodiment, at operation 504 a surface irregularity level to greyscale mapping database is generated such as any database discussed above with respect to FIG. 3A, FIGS. 2A through 2F and corresponding FIGS. 4A through 4F. In one embodiment, the surface irregularity level to greyscale mapping database contains mapping data that maps surface irregularities level to Near InfraRed (NIR) image greyscale values for one or more wood products.

Once a surface irregularity level to greyscale mapping database is generated at operation 504, process flow proceeds to operation 506. At operation 506, an NIR analysis station is provided. In one embodiment, the NIR analysis station is substantially similar to any NIR analysis station discussed above with respect to FIGS. 3A and 3B. As discussed above, in one embodiment, the NIR analysis station includes one or more sources of illumination positioned to illuminate a surface of a wood product and one or more NIR cameras positioned to capture one or more NIR images of the illuminated surface of the wood product.

Once an NIR analysis station is provided at operation 506, process flow proceeds to operation 508. In one embodiment, at operation 508, a wood product to be analyzed is positioned in the NIR analysis station of operation 506 such that a first surface of the wood product to be analyzed is illuminated by the one or more illumination sources using any of the methods and systems discussed above with respect to FIGS. 3A and 3B.

Once the wood product to be analyzed is positioned in the NIR analysis station at 508, process flow proceeds to operation 510. In one embodiment, at operation 510 the one or more NIR cameras of NIR analysis station take one or more NIR images of the illuminated first surface of the wood product using any of the methods and systems discussed above with respect to FIGS. 3A and 3B.

Once the one or more NIR cameras of NIR analysis station take one or more NIR images of the illuminated first surface of the wood product at operation 510, process flow proceeds to operation 512.

In one embodiment, at operation 512, the one or more NIR images of the illuminated first surface of the wood product of operation 510 are processed using any of the methods and systems discussed above with respect to FIGS. 3A and 3B, FIGS. 2A through 2F, and corresponding FIGS. 4A through 4F, to generate NIR greyscale images indicating irregularities in the illuminated first surface of the wood product.

Once the one or more NIR images of the illuminated first surface of the wood product are processed to generate NIR greyscale images indicating different irregularities in the illuminated first surface of the wood product at operation 512, process flow proceeds to operation 514.

In one embodiment, at operation 514, the NIR greyscale images are processed using the surface irregularity level to greyscale mapping database to identify irregularity levels for the first surface of the wood product by any of the methods and systems discussed above with respect to FIGS. 3A and 3B, FIGS. 2A through 2F, and corresponding FIGS. 4A through 4F.

Once the NIR greyscale images are processed using the surface irregularity level to greyscale mapping database to identify irregularity levels for the first surface of the wood product at operation 514, process flow proceeds operation 516.

In one embodiment, at operation 516 a grade is assigned to the wood product based on the identified irregularity levels for the first surface of the wood product using any of the methods and systems discussed above with respect to FIGS. 3A and 3B, FIGS. 2A through 2F, and corresponding FIGS. 4A through 4F.

Once a grade is assigned to the wood product based on the identified irregularity levels for the first surface of the wood product at operation 516, process flow proceeds to operation 518. In one embodiment, at operation 518, based at least in part, on the grade assigned to the wood product, one or more actions are taken with respect to the wood product including any of the actions discussed above with respect to the methods and systems discussed above with respect to FIGS. 3A and 3B.

Once one or more actions with respect to the wood product at operation 518, process flow proceeds to END operation 524 where process 500 is exited to await new samples and/or data.

Figure 6:
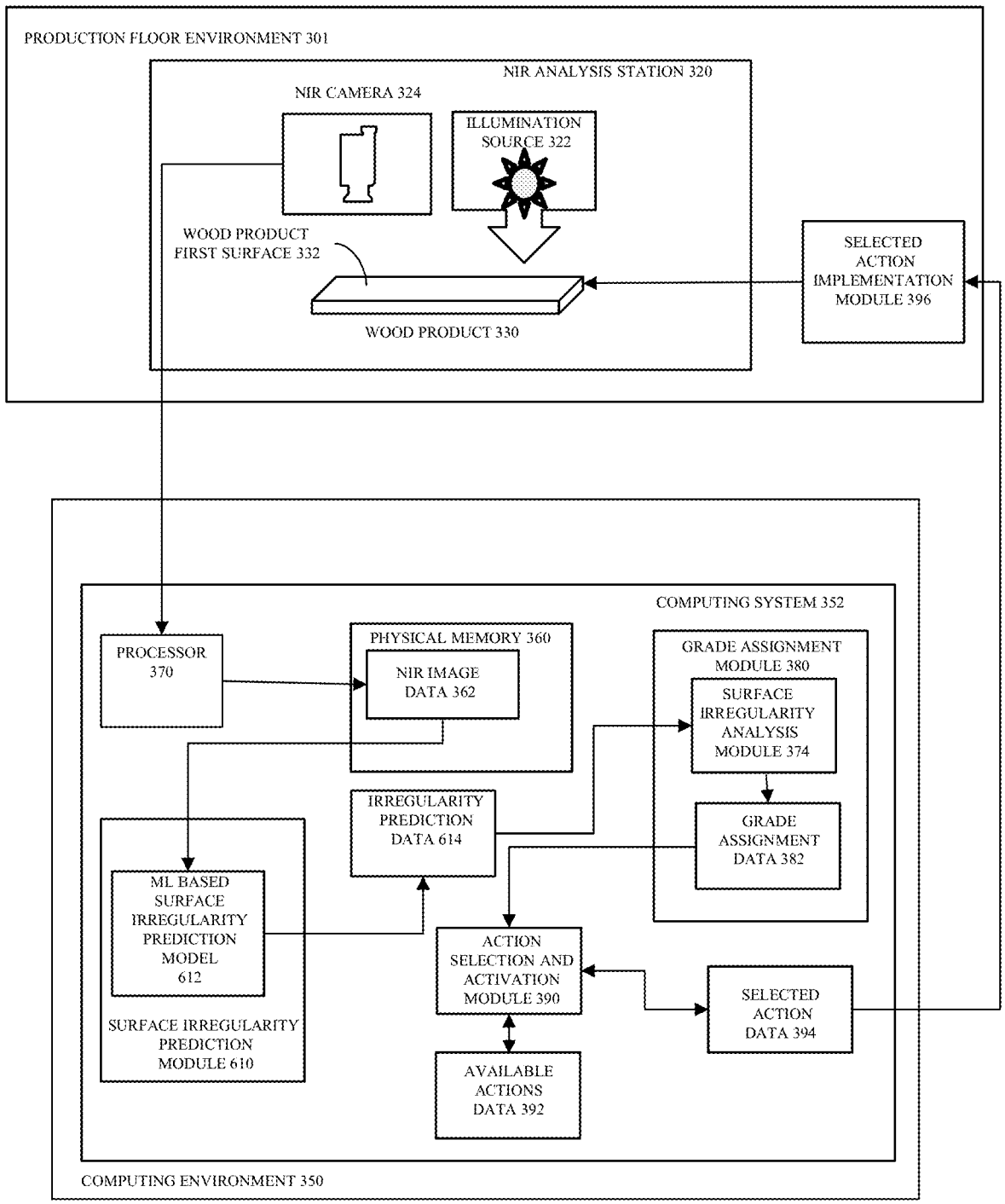
FIG. 6 is simplified block diagram of a system for detecting surface irregularity levels in a wood product using NIR technology and machine learning methods in accordance with one embodiment.

FIG. 6 is simplified block diagram of one embodiment of a system 600 for detecting surface irregularity levels in a wood product using NIR technology and machine learning methods in accordance with one embodiment.

In one embodiment, system 600, like system 300 of FIGS. 3A and 3B, includes production floor environment 301 and a computing environment 350.

As seen in FIG. 6, like system 300 of FIGS. 3A and 3B, production floor environment 301 includes NIR analysis station 320 and selected action implementation module 396. As seen in FIG. 6, NIR analysis station 320 includes one or more illumination sources, such as illumination source 322, positioned to illuminate a wood product first surface 332 of a wood product 330. In various embodiments, the one or more sources of illumination, such as illumination source 322, can include one or more LED light sources. In other embodiments, the one or more illumination sources, such as illumination source 322, can include, but are not limited to, halogen or halogen and tungsten light sources, or any other light sources, as discussed herein, and/or as known in the art at the time of filing, and/or as developed after the time of filing.

As seen in FIG. 6, NIR analysis station 320 also includes one or more NIR cameras, such as NIR camera 324, positioned to capture NIR image data 362 representing one or more NIR images of the illuminated wood product first surface 332 of the wood product 330. In one embodiment, one or more NIR cameras, such as NIR camera 324, are adjustably positioned and adjustably focused to capture one or more NIR images of the illuminated wood product first surface 332 of the wood product 330.

As seen in FIG. 6, the wood product 330 to be analyzed in the NIR analysis station 320 is positioned in NIR analysis station 320. In various embodiments, the wood product 330 can be any wood product as discussed herein, and/or as known in the art at the time of filing, and/or as becomes known after the time of filing. In one embodiment, the wood product 330 to be analyzed is a veneer sheet.

In one embodiment, the wood product 330 to be analyzed is positioned such that the wood product first surface 332 of the wood product 330 to be analyzed is illuminated by the illumination source 322 and is within view and focus of NIR camera 324. In one embodiment, the wood product 330 is positioned in the NIR analysis station 320 by passing the wood product 330 through the NIR analysis station 320 on a conveyor system (not shown).

As seen in FIG. 6, like system 300 of FIGS. 3A and 3B, computing environment 350 includes computing system 352. However, unlike system 300 of FIGS. 3A and 3B, in one embodiment, computing system 352 of system 600 does not include surface irregularity to greyscale mapping database 310 but instead includes surface irregularity prediction module 610.

In one embodiment, surface irregularity prediction module 610 includes one or more trained Machine Learning (ML) based surface irregularity prediction models, such as Machine Learning (ML) based surface irregularity prediction model 612. In various embodiments the one or more trained machine learning based surface irregularity prediction models, such as machine learning based surface irregularity prediction model 612, are trained using NIR image data for one or more wood products and corresponding determined irregularity levels for the one or more wood products.

Various types of machine learning based models are well known in the art. Consequently the one or more trained machine learning based surface irregularity prediction models, such as machine learning based surface irregularity prediction model 612, can be any machine learning based model type or use any machine learning based algorithm, as discussed herein, and/or as known in the art at the time of filing, and/or as becomes known or available after the time of filing.

Specific illustrative examples of machine learning based model types and machine learning based algorithms that can be used for, or with, the one or more trained machine learning based surface irregularity prediction models of surface irregularity prediction module 610, such as machine learning based surface irregularity prediction model 612, include, but are not limited to: supervised machine learning-based models; semi-supervised machine learning-based models; unsupervised machine learning-based models; classification machine learning-based models; logistical regression machine learning-based models; neural network machine learning-based models; and deep learning machine learning-based models.

In various embodiments, and largely depending on the machine-learning based models used, the NIR image data for one or more wood products, including in some cases various environmental and production parameters, and corresponding determined irregularity levels for the one or more wood products can be processed using various methods known in the machine learning arts to identify elements and vectorize the NIR image data and/or corresponding determined irregularity levels data. As a specific illustrative example, in a case where the machine leaning based model is a supervised model, the NIR image data can be analyzed and processed into elements found to be indicative of a wood product irregularity levels, product failures, and product performance. Then these elements are used to create vectors in multidimensional space which are, in turn, used as input data for one or more machine learning models. The correlated determined irregularity levels, product failures, and product performance data for each NIR image data vector is then used as a label for the resulting vector. This process is repeated for multiple, often millions, of correlated pairs of NIR image data vector and determined irregularity levels, product failures, and product performance data with the result being one or more trained machine learning based surface irregularity prediction models.

Then when new NIR image data is obtained, this new NIR image data is also vectorized and the new NIR image vector data is provided as input data to the one or more trained machine learning based surface irregularity prediction models. The new NIR image vector data is then processed to find a distance between the new NIR image vector and previously labeled NIR image vectors, whose associated irregularity level data is known. Based on a calculated distance between the new NIR image vector data and the previously labeled NIR image vector data, a probability that the new NIR image vector data correlates to an irregularity level, product failure, or product performance associated with the previously labeled NIR image vector data can be calculated. This results in a probability score for the wood product being analyzed.

Those of skill in the art will readily recognize that there are many different types of machine learning based models known in the art. Consequently, the specific illustrative example of a specific supervised machine learning based model discussed above is not limiting.

As seen in FIG. 6, computing system 352 also includes physical memory 360. In one embodiment, the physical memory 360 includes NIR image data 362 representing one or more NIR images of the illuminated wood product first surface 332 of the wood product 330 captured using NIR camera 324.

As seen in FIG. 6, in one embodiment, computing system 352 includes one or more processors, such as processor 370, for generating the NIR image data 362 representing one or more NIR images of the illuminated wood product first surface 332 of the wood product 330 from NIR camera 324.

In one embodiment, NIR image data 362 is provided to surface irregularity prediction module 610 where it is processed/vectorized and provided to machine learning based irregularity level prediction model 612.

Machine learning based irregularity level prediction model 612 then processes the vectorized NIR image data 362 as discussed above and generates irregularity prediction data 614 for the wood product 330.

As seen in FIG. 6, irregularity prediction data 614 for the wood product 330 is then provided to grade assignment module 380. As discussed above, grade assignment module 380 then assigns a grade to the wood product 330 based on irregularity prediction data 614 for the wood product 330.

As seen in FIG. 6, grade assignment module 380 includes irregularities analysis module 374 which, along with processor 370, processes irregularity prediction data 614 for the wood product 330 and generates grade assignment data 382 based on this processing As seen in FIG. 6, in one embodiment, grade assignment data 382 is provided to action selection and activation module 390 which selects an appropriate action of the actions represented in available actions data 392 based, at least in part on the grade indicated by grade assignment data 382. As seen in FIG. 6, in one embodiment, the determined appropriate action is represented by selected action data 394.

As seen in FIG. 6, in one embodiment, selected action data 394 is forwarded to an action activation module, such as selected action implementation module 396 in production floor environment 301, to initialize one or more actions with respect to the wood product 330 based, at least in part, on the grade represented by grade assignment data 382 and assigned to the wood product 330 by action selection and activation module 390.

In one embodiment, one or more actions that can be taken represented in available actions data 392 include, but are not limited to: sorting wood product 330 into a bin or location based, at least in part, on the grade represented by grade assignment data 382 and assigned to the wood product 330; restricting the use of the wood product 330 based, at least in part, on the grade represented by grade assignment data 382 and assigned to the wood product 330; rejecting the wood product 330 based, at least in part, on the grade represented by grade assignment data 382 and assigned to the wood product 330; sending the wood product 330 back for further processing based, at least in part, on the grade represented by grade assignment data 382 and assigned to the wood product 330; adjusting one or more processing parameters of a production line based, at least in part, on the grade represented by grade assignment data 382 and assigned to the wood product 330 and one or more similarly graded similar wood products; adjusting one or more preconditioning parameters on a production line based, at least in part, on the grade represented by grade assignment data 382 and assigned to the wood product 330 and/or one or more similarly graded wood products; adjusting one or more wood product cutting parameters on a production line based, at least in part, on the grade represented by grade assignment data 382 and assigned to the wood product 330 and/or one or more similarly graded wood products; and selecting a type and amount of glue used on a production line in production floor environment 301 based, at least in part, on the grade represented by grade assignment data 382 and assigned to the wood product 330 and/or the grades assigned other wood products.

Those of skill in the art will ready recognize that the specific illustrative example of one embodiment of FIG. 6 is but one example of numerous possible production environments and arrangement of components. Consequently, the specific illustrative example of one embodiment shown in FIG. 6 is not intended to limit the scope of the invention as set forth in the claims below.

As a specific illustrative example of possible variations, in some embodiments, the NIR analysis station 320 can include one or more illumination sources 322 positioned to illuminate two or more surfaces of a wood product and one or more NIR cameras 324 positioned to capture one or more NIR images of the two or more illuminated surfaces of the wood product.

Figure 7:
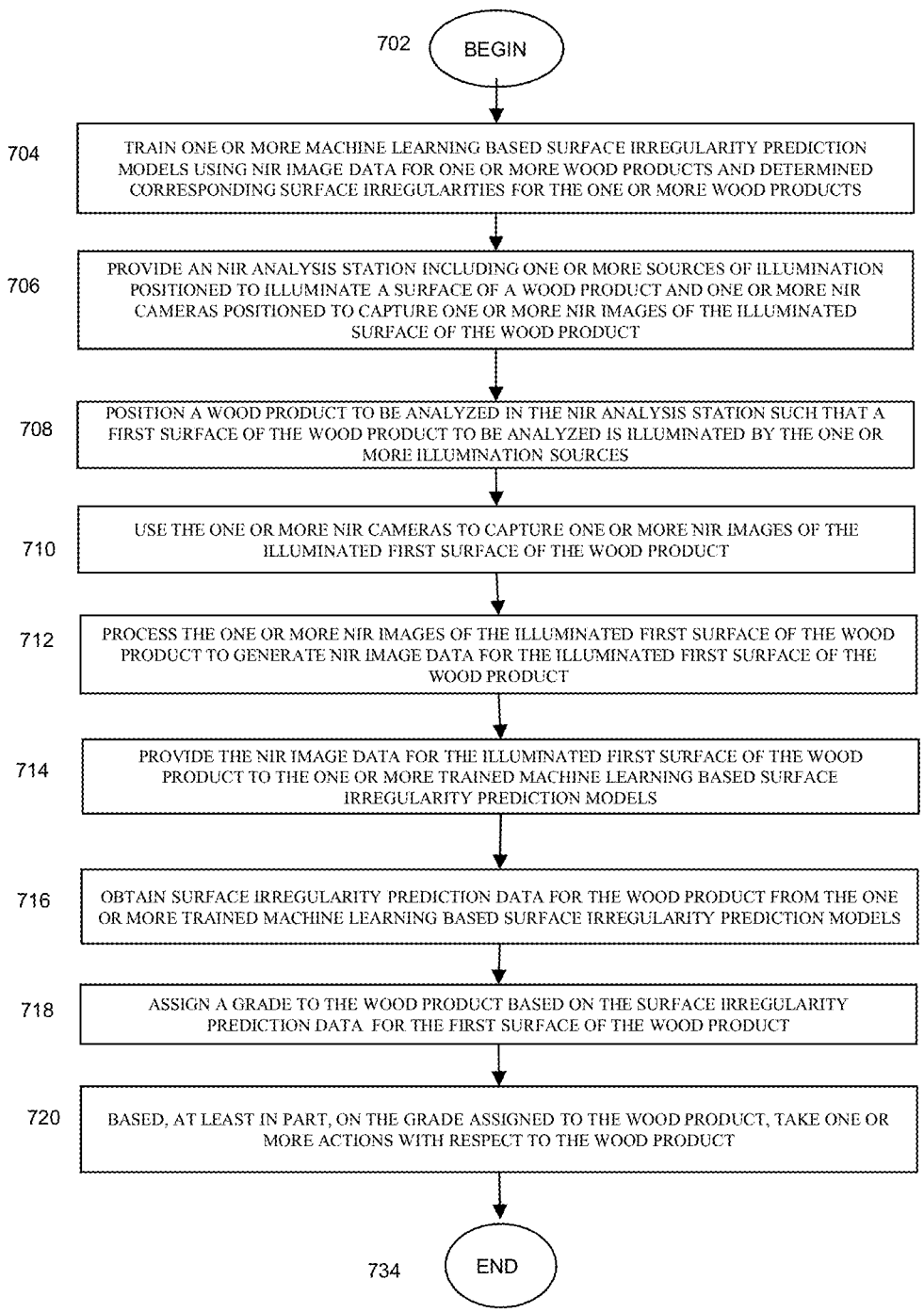
FIG. 7 is flow chart of a process for detecting surface irregularity levels in a wood product using NIR technology and machine learning methods in accordance with one embodiment.

FIG. 7 is flow chart of a process 700 for detecting surface irregularity levels in a wood product using NIR technology and machine learning methods in accordance with one embodiment.

As seen in FIG. 7, process 700 begins at BEGIN operation 702 and then process proceeds to operation 704. In one embodiment, at operation 704 one or more machine learning based surface irregularity prediction models are trained using NIR image data for one or more wood products and determined corresponding irregularity levels and/or failures for the one or more wood products by any of the systems or methods discussed above with respect to FIG. 6.

In one embodiment, once one or more machine learning based surface irregularity prediction models are trained using NIR image data for one or more wood products and determined corresponding irregularity levels for the one or more wood products at operation 704, process flow proceeds to operation 706.

At operation 706, an NIR analysis station is provided. In one embodiment, the NIR analysis station is substantially similar to any NIR analysis station discussed above with respect to FIGS. 3A, 3B, and 6, FIGS. 2A through 2F, and corresponding FIGS. 4A through 4F. As discussed above, in one embodiment, the NIR analysis station includes one or more sources of illumination positioned to illuminate a surface of a wood product and one or more NIR cameras positioned to capture one or more NIR images of the illuminated surface of the wood product.

Once an NIR analysis station is provided at operation 706, process flow proceeds to operation 708. In one embodiment, at operation 708, a wood product to be analyzed is positioned in the NIR analysis station of operation 706 such that a first surface of the wood product to be analyzed is illuminated by the one or more illumination sources using any of the methods and systems discussed above with respect to FIGS. 3A, 3B, and 6, FIGS. 2A through 2F, and corresponding FIGS. 4A through 4F.

Once the wood product to be analyzed is positioned in the NIR analysis station at 708, process flow proceeds to operation 710. In one embodiment, at operation 710 the one or more NIR cameras of NIR analysis station take one or more NIR images of the illuminated first surface of the wood product using any of the methods and systems discussed above with respect to FIGS. 3A, 3B, and 6, FIGS. 2A through 2F, and corresponding FIGS. 4A through 4F.

Once the one or more NIR cameras of NIR analysis station take one or more NIR images of the illuminated first surface of the wood product at operation 710, process flow proceeds to operation 712.

In one embodiment, at operation 712, the one or more NIR images of the illuminated first surface of the wood product of operation 710 are processed, using any of the methods and systems discussed above with respect to FIGS. 3A, 3B, and 6, FIGS. 2A through 2F, and corresponding FIGS. 4A through 4F, to generate NIR image data such as any NIR image data discussed above with respect to FIGS. 3A, 3B, and 6, FIGS. 2A through 2F, and corresponding FIGS. 4A through 4F.

Once the one or more NIR images of the illuminated first surface of the wood product are processed to generate NIR image data at operation 712, process flow proceeds to operation 714.

In one embodiment, at operation 714 the NIR image data for the illuminated first surface of the wood product of operation 712 is processed and provided to the one or more trained machine learning based surface irregularity prediction models using any of the methods and systems discussed above with respect to FIGS. 3A, 3B, and 6, FIGS. 2A through 2F, and corresponding FIGS. 4A through 4F.

Once the NIR image data for the illuminated first surface of the wood product is processed and provided to the one or more trained machine learning based surface irregularity prediction models at operation 714, process flow proceeds to process 716.

In one embodiment, at operation 716 the one or more trained machine learning based surface irregularity prediction models generate irregularity prediction data for the wood product using any of the methods and systems discussed above with respect to FIG. 6.

Once irregularity prediction data for the wood product is obtained from the one or more trained machine learning based surface irregularity prediction models at operation 716, process flow proceeds to operation 718.

In one embodiment, at operation 718, a grade is assigned to the wood product based on the surface irregularity prediction data for the wood product at operation 716 using any of the methods and systems discussed above with respect to FIGS. 3A, 3B, and 6.

Once a grade is assigned to the wood product based on the surface irregularity prediction data for the wood product at operation 718, process flow proceeds to operation 720. In one embodiment, at operation 720, based, at least in part, on the grade assigned to the wood product, one or more actions are taken with respect to the wood product including any of the actions discussed above with respect to the methods and systems discussed above with respect to FIGS. 3A, 3B, and 6.

Once one or more actions with respect to the wood product at operation 720, process flow proceeds to END operation 734 where process 700 is exited to await new samples and/or data.

Figure 8:
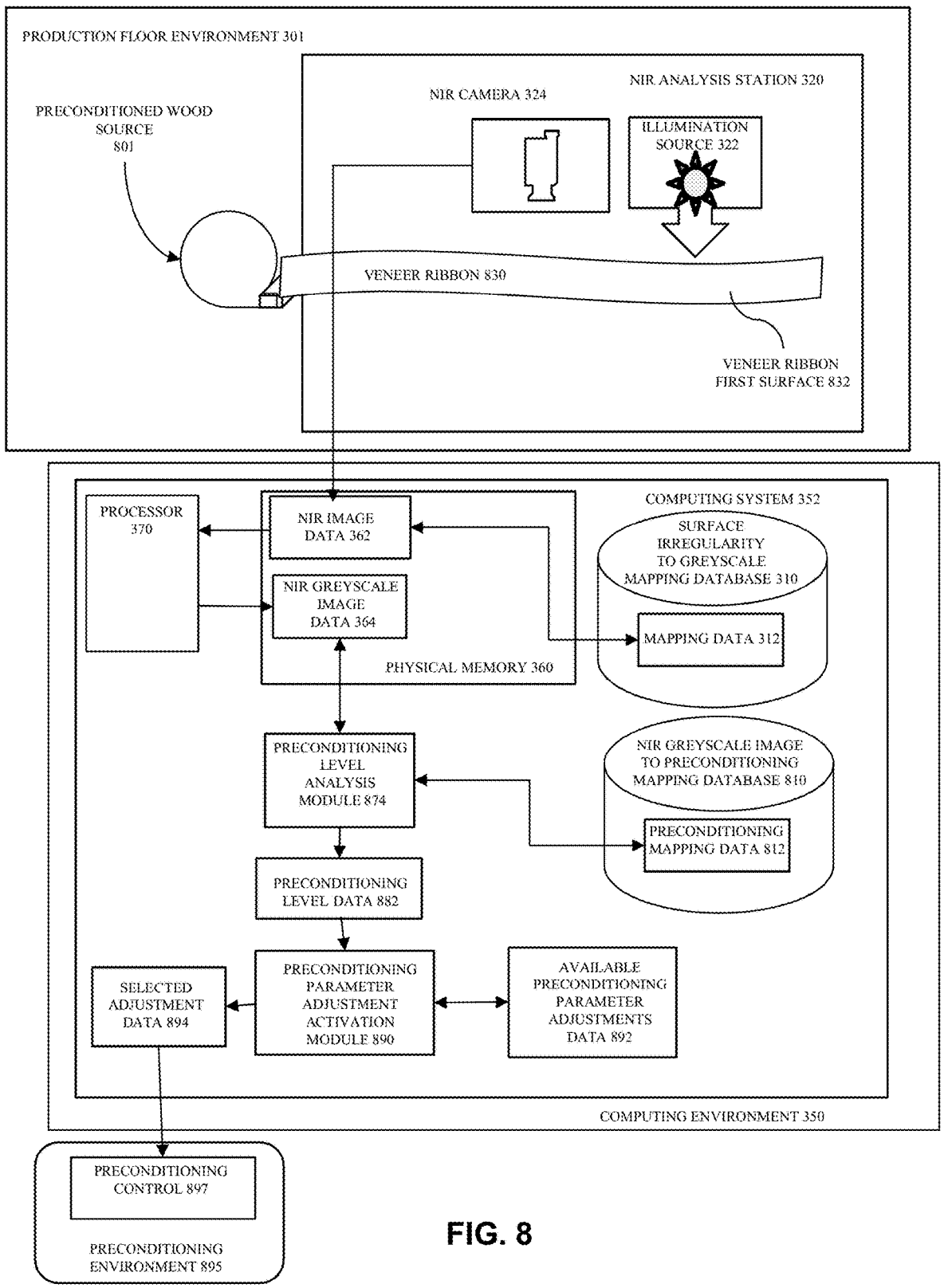
FIG. 8 is simplified block diagram of a system for adjusting a preconditioning process of wood sources used to produce wood products based on a level of irregularity of a first surface of the wood products in accordance with one embodiment.

FIG. 8 is simplified block diagram of one embodiment of a system 800 for adjusting a preconditioning process of wood sources used to produce wood products based on NIR imagery of a first surface of the wood products in accordance with one embodiment.

As with system 300 discussed above with respect to FIG. 3A, in one embodiment, system 800 includes production floor environment 301 and computing environment 350. As seen in FIG. 8, production floor environment 301 includes NIR analysis station 320. As seen in FIG. 8, NIR analysis station 320 includes one or more illumination sources, such as illumination source 322, positioned to illuminate a surface of a wood product. In various embodiments, the one or more illumination sources, such as illumination source 322, can include one or more LED light sources. In other embodiments, the one or more illumination sources, such as illumination source 322, can include, but are not limited to, halogen, halogen and tungsten light sources, or any other light sources, as discussed herein, and/or as known in the art at the time of filing, and/or as developed after the time of filing.

As with system 300 discussed above with respect to FIG. 3A, in FIG. 8, NIR analysis station 320 also includes one or more NIR cameras, such as NIR camera 324, positioned to capture NIR image data 362 representing one or more NIR images of the illuminated surface of the wood product. In one embodiment, the one or more NIR cameras, such as NIR camera 324, are adjustably positioned and adjustably focused to capture any desired one or more NIR images of the illuminated surface of the wood product.

As seen in FIG. 8, and as discussed below, a wood product to be analyzed in the NIR analysis station 320 is positioned in NIR analysis station 320. In the specific illustrative example of FIG. 8, the wood product is a veneer ribbon 830 rotary cut from preconditioned wood source 801, such as a preconditioned peeler log.

In one embodiment, the veneer ribbon 830 to be analyzed is positioned such that a veneer ribbon first surface 832 of the veneer ribbon 830 to be analyzed is illuminated by the illumination source 322 and the a sample portion or entire veneer ribbon first surface 832 is within view and focus of NIR camera 324. In one embodiment, the veneer ribbon 830 is positioned in the NIR analysis station 320 by passing the veneer ribbon 830 through the NIR analysis station 320 on a conveyor system.

In various embodiments, the one or more NIR cameras, such as NIR camera 324, can be of any resolution desired. As noted above, when the one or more NIR cameras, such as NIR camera 324, are used to scan the veneer ribbon first surface 832 of a veneer ribbon 830 for irregularities and create an NIR image data 362 of the veneer ribbon first surface 832, essentially each pixel generated by NIR camera 324 is a sample point. Consequently, the resolution and accuracy of the surface irregularity detection process is only limited by the number of pixels the NIR camera 324 has covering the field of view, e.g., the entire veneer ribbon first surface 832 of veneer ribbon 830. Consequently, in the case where NIR camera 324 is a 1.3 mega pixel camera, there are essentially 1,300,000 individual measurement points on the veneer ribbon first surface 832. In addition, NIR wavelengths are in the range of 750 nanometers (nm) to 3500 nm which are much smaller that the visible wavelengths of 380 to 740 nm. Consequently, using NIR cameras, such as NIR camera 324, results in resolutions and accuracy that simply cannot be achieved using traditional surface magnified visual image methods.

Therefore, using NIR cameras, such as NIR camera 324, system 800 is capable of detecting irregularities in a wide range of samples sizes ranging from of a traditional 2"×2" square, to a full 4'×8' sheet or panel surface, and, by using a series of NIR images spliced together, up to a 80'-120' ribbon of material. This, in turn, allows the disclosed embodiments to be implemented without significantly slowing down the production process or increasing the cost of the finished wood product.

As seen in FIG. 8, computing environment 350 includes computing system 352. As seen in FIG. 8, in one embodiment, computing system 352 includes surface irregularity to greyscale mapping database 310 containing mapping data 312 that maps surface irregularities to Near InfraRed (NIR) image greyscale values for one or more wood products.

As discussed in some detail above with respect to FIG. 3A, using NIR images, extremely granular differences in irregularity levels can be detected. In general, locations with different levels of irregularities absorb/reflect different amounts of NIR radiation at specific frequencies. In operation, when NIR radiation of a given frequency is applied to a veneer ribbon first surface 832 of veneer ribbon 830, more NIR energy is reflected from surfaces that are perpendicular the NIR camera lens. Consequently, at locations having irregularities such that the surfaces are not perpendicular the NIR camera lens will appear darker, i.e., have a greater greyscale value.

When the NIR camera 324 takes an image of the veneer ribbon first surface 832, the NIR camera 324 picks up the NIR energy reflected off veneer ribbon first surface 832 at approximately 90 degrees. Consequently, when the NIR camera 324 takes an image of the veneer ribbon first surface 832, the areas of irregularities, which scatter more NIR energy at angles other than 90 degrees and therefore reflect less NIR energy, appear darker than dry areas. In addition, the higher or more significant the irregularities that are present, the darker the area appears because less NIR energy is reflected to be captured by the NIR camera 324.

Using this fact, NIR image data 362 captured by the NIR camera 324 can be processed into NIR greyscale image data 364. Greyscale images can be of varying resolution, or bit, types. A 16-bit integer greyscale image provides 65535 available tonal steps from 0 (black) to 65535 (white). A 32-bit integer greyscale image theoretically will provide 4,294,967,295 tonal steps from 0 (black) to 4294967295 (white). Converting an NIR image based on these number of greyscale tonal steps results in a margin of error of significantly less than 0.1%.

In some embodiments, two or more NIR cameras are utilized, such as NIR camera 324, that are operated at different NIR frequencies and/or that are positioned a different angles with respect to veneer ribbon first surface 832. This allows different types and levels of irregularities to be detected. In addition, using two or more NIR cameras, such as NIR camera 324, that are positioned at different angles means that different irregularities will have surfaces perpendicular to the camera lens and therefore will yield a 3-D effect when a composite NIR image is constructed. A more detailed discussion of a one example of a multi-NIR camera system is discussed above with respect to FIG. 3B.

Returning to FIG. 8, and using the concepts discussed above, the mapping data 312 of surface irregularity to greyscale mapping database 310 is obtained through one or more empirical and/or manual processes, as discussed above with respect to FIG. 3A.

FIGS. 4A to 4F are illustrative examples of NIR images of surfaces of veneer ribbons produced under various optimal and non-optimal production parameters. In the specific examples of FIGS. 4A to 4F the NIR image illustrations of 4A, 4B, 4C, 4D, 4E and 4F, correlate to the magnified visual image illustrations of FIGS. 2A, 2B, 2C, 2D, 2E and 2F, respectively.

Of particular relevance to system 800, and adjusting preconditioning parameters, FIG. 4A is a representation of an NIR image of the surface of a veneer ribbon or sheet that was produced from an optimally preconditioned conditioned log, FIG. 4B is a representation of an NIR image of the surface of a veneer ribbon or sheet that was produced from an over preconditioned log, and FIG. 4C is a representation of an NIR image of the surface of a veneer ribbon or sheet that was produced from an under preconditioned log.

Therefore, in the specific illustrative examples of FIGS. 2A and 4A, sample wood products determined empirically to be produced from optimally preconditioned wood sources, such as shown in FIG. 2A, can be passed through NIR analysis station 320 to generate known optimally preconditioned wood NIR images of surface 403 of veneer ribbon 401, as shown in FIG. 4A.

Similarly, in the specific illustrative examples of FIGS. 2B and 4B, sample wood products determined empirically to be produced from over preconditioned wood sources, such as shown in FIG. 2B, can be passed through NIR analysis station 320 to generate known over preconditioned wood NIR images of surface 413 of veneer ribbon 411, as shown in FIG. 4B.

Similarly, in the specific illustrative examples of FIGS. 2C and 4C, sample wood products determined empirically to be produced from under preconditioned wood sources, such as shown in FIG. 2C, can be passed through NIR analysis station 320 to generate known under preconditioned wood NIR images of surface 423 of veneer ribbon 421, as shown in FIG. 4C.

This process is continued for multiple levels and types of surface irregularities and greyscale data for each irregularity increment is determined and correlated to the respective surface irregularities increment. In this way, mapping data 312 mapping each specific surface irregularities to specific greyscale values and preconditioning levels is generated for wood products. The process can then be repeated for different wood products, different types of wood, and under varying parameters and conditions. Consequently, the specific examples discussed herein are but illustrative examples and do not limit the scope of the invention as set forth in the claims below.

Returning the FIG. 8, computing system 352 also includes NIR greyscale image to preconditioning mapping database. In one embodiment, NIR greyscale image to preconditioning mapping database 810 include preconditioning mapping data 812 that maps NIR greyscale images to particular preconditioning parameters and issues based on known data obtained from known condition greyscale images, such as images 4A, 4B, and 4C.

Computing system 352 also includes physical memory 360. In one embodiment, the physical memory 360 includes NIR image data 362 representing one or more NIR images of the illuminated veneer ribbon first surface 832 of the veneer ribbon 830 captured using NIR camera 324. Physical memory 360 also includes NIR greyscale image data 364. In one embodiment, computing system 352 includes one or more processors 370 for processing the NIR image data representing one or more NIR images of the illuminated veneer ribbon first surface 832 of the veneer ribbon 830 to generate NIR greyscale image data 364 indicating different irregularity levels in the illuminated veneer ribbon first surface 832 of the veneer ribbon 830.

In one embodiment, processor 370 processes the NIR greyscale image data 364 using the mapping data 312 from surface irregularity to greyscale mapping database 310 to identify irregularity levels for the veneer ribbon first surface 832 of the veneer ribbon 830.

As seen in FIG. 8, in one embodiment, computing system 352 includes a preconditioning level analysis module 874 which analyzes preconditioning mapping data 812 and NIR greyscale image data 364 to determine a preconditioning parameter level represented by preconditioning level data 882. In various embodiments, preconditioning level data 882 determines which, if any, preconditioning parameters must be readjusted to adjust the preconditioning levels of subsequent wood sources.

Available preconditioning parameter adjustments data 892 includes data representing the available precondition adjustments such as, adjusting of chemical composition of the caustic water mix by adding or subtracting chemical or changing chemical; adjusting the temperature of the caustic water mix; or adjusting the soak time for preconditioned wood source 801, such as logs, in the vats of caustic water mix. The determined preconditioning parameter adjustment is then represented by preconditioning level data 882.

In some embodiments, preconditioning level analysis module 874 includes one or more machine learning based models such as any machine learning based models discussed herein, and/or as known in the art at the time of filing, and/or as become known/available after the time of filing.

For instance, based on the analysis of NIR greyscale image data 364 and preconditioning mapping data 812, preconditioning level analysis module 874 may determine a probability that the chemical used, or amount of chemical used in the preconditioning vat soak needs to be adjusted. Likewise, based on the analysis of NIR greyscale image data 364 and preconditioning mapping data 812, preconditioning level analysis module 874 may determine that the preconditioning vat soak time needs to be adjusted. Similarly, based on the analysis of NIR greyscale image data 364 and preconditioning mapping data 812, preconditioning level analysis module 874 may determine that the preconditioning temperature needs to be adjusted. In some cases, based on the analysis of NIR greyscale image data 364 and preconditioning mapping data 812, preconditioning level analysis module 874 may determine any combination, or all, of these preconditioning parameters, or other preconditioning parameters, need to be adjusted.

In various embodiments, the adjustments determined to be necessary by preconditioning level analysis module 874 are then represented by preconditioning level data 882 which is used to adjust the preconditioning parameters for subsequent wood sources. Once generated by preconditioning level analysis module 874, preconditioning level data 882 is provided to preconditioning parameter adjustment activation module 890 which generates selected adjustment data 894.

In various embodiments, selected adjustment data is then transferred to preconditioning control 897 in preconditioning environment 895 where the adjustments determined to be necessary by preconditioning level analysis module 874 are implemented. These can include one or more of: adjusting of chemical composition of the caustic water mix by adding or subtracting chemical or changing chemical; adjusting the temperature of the caustic water mix; or adjusting the soak time for preconditioned wood source 801, such as logs, in the vats of caustic water mix.

Using system 800 the preconditioning process so critical to veneer ribbon 830 production is adjusted dynamically using feedback based on actual wood product NIR surface image analysis. Consequently, using system 800, finding the best combination of chemical composition of the caustic water mix, temperature of the caustic water mix, and soak time for the logs in the vats of caustic water mix is more accurately determined based on empirical and relative real-time data. As a result, accurate adjustments can be made to minimize wasted product and maximize product value.

Those of skill in the art will ready recognize that the specific illustrative examples of one embodiment of a production floor environment 301 and components shown in FIG. 8 are but specific examples of numerous possible production environments and arrangement of physical components. Consequently, the specific illustrative example of an embodiment of a production floor environment 301 and components shown in FIG. 8 is not intended to limit the scope of the invention as set forth in the claims below.

As a specific illustrative example of potential variations, in various embodiments, the NIR analysis station 320 can include one or more illumination sources 322 positioned to illuminate two or more surfaces of a wood product and one or more NIR cameras 324 positioned to capture one or more NIR images of the two or more illuminated surfaces of the wood product.

As a further specific illustrative example of variations possible, additional input data can be considered such as current ambient temperature and humidity. The combination of these parameters can be analyzed by an AI/ML algorithm to further refine the production parameters for overall process efficiency.

These and numerous other variations are possible and contemplated by the inventors to be within the scope of the invention as set forth in the claims below.

Figure 9:
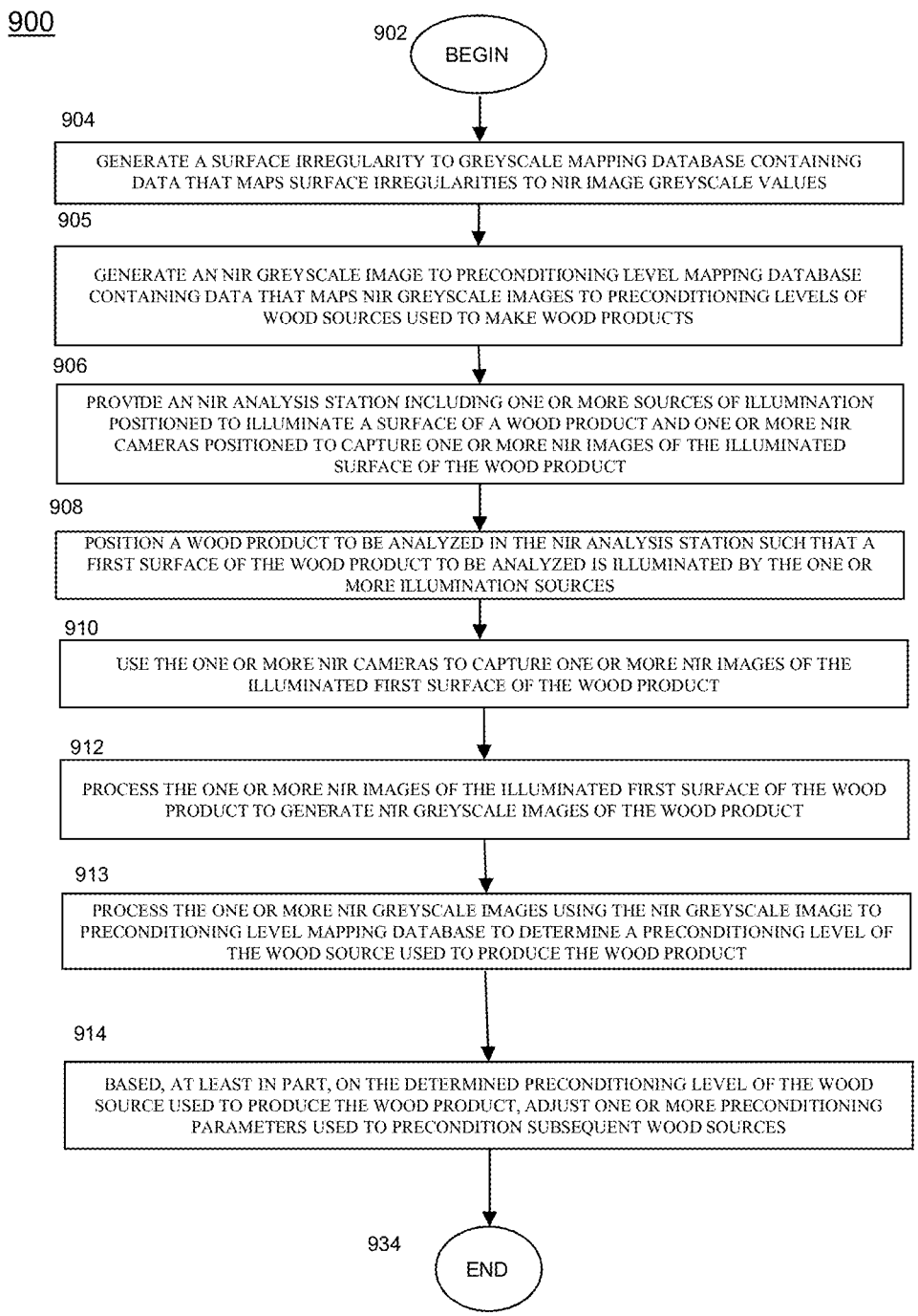
FIG. 9 is flow chart of a process for adjusting a preconditioning process of wood sources used to produce wood products based on a level of irregularity of a first surface of the wood products in accordance with one embodiment.

FIG. 9 is flow chart of a process 900 for adjusting a preconditioning process of wood sources used to produce wood products based on a level of irregularity of a first surface of the wood products in accordance with one embodiment.

As seen in FIG. 9, process 900 begins at BEGIN operation 902 and then process proceeds to operation 904. In one embodiment, at operation 904 a surface irregularity level to greyscale mapping database is generated such as any database discussed above with respect to FIG. 3A, FIG. 8, FIGS. 2A through 2C, and corresponding FIGS. 4A through 4C. In one embodiment, the surface irregularity level to greyscale mapping database contains mapping data that maps surface irregularities to Near InfraRed (NIR) image greyscale values for one or more wood products.

Once a surface irregularity level to greyscale mapping database is generated at operation 904, process flow proceeds to operation 905. In one embodiment, at operation 905 an NIR greyscale image to preconditioning level mapping database is generated using any of the methods and systems discussed above with respect to FIG. 8.

Once an NIR greyscale image to preconditioning level mapping database is generated at operation 905, process flow proceeds to operation 906. At operation 906, an NIR analysis station is provided. In one embodiment, the NIR analysis station is substantially similar to any NIR analysis station discussed above with respect to FIGS. 3A, 3B, and 8. As discussed above, in one embodiment, the NIR analysis station includes one or more sources of illumination positioned to illuminate a surface of a wood product and one or more NIR cameras positioned to capture one or more NIR images of the illuminated surface of the wood product.

Once an NIR analysis station is provided at operation 906, process flow proceeds to operation 908. In one embodiment, at operation 908, a wood product to be analyzed is positioned in the NIR analysis station of operation 906 such that a first surface of the wood product to be analyzed is illuminated by the one or more illumination sources using any of the methods and systems discussed above with respect to FIG. 3A, FIG. 8, FIGS. 2A through 2C, and corresponding FIGS. 4A through 4C.

Once the wood product to be analyzed is positioned in the NIR analysis station at 908, process flow proceeds to operation 910. In one embodiment, at operation 910 the one or more NIR cameras of NIR analysis station take one or more NIR images of the illuminated first surface of the wood product using any of the methods and systems discussed above with respect to FIGS. 3A, 3B and 8.

Once the one or more NIR cameras of NIR analysis station take one or more NIR images of the illuminated first surface of the wood product at operation 910, process flow proceeds to operation 912.

In one embodiment, at operation 912, the one or more NIR images of the illuminated first surface of the wood product of operation 910 are processed using any of the methods and systems discussed above with respect to FIGS. 3A, 3B, FIG. 8, FIGS. 2A through 2C, and corresponding FIGS. 4A through 4C, to generate NIR greyscale images indicating different irregularity levels in the illuminated first surface of the wood product.

Once the one or more NIR images of the illuminated first surface of the wood product are processed to generate NIR greyscale images indicating different irregularity levels in the illuminated first surface of the wood product at operation 912, process flow proceeds to operation 913.

In one embodiment, at operation 913, the NIR greyscale images are processed using NIR greyscale image to preconditioning level mapping database to determine a preconditioning level and preconditioning parameter adjustments using any of the methods and systems discussed above with respect to FIGS. 3A and 3B, FIG. 8, FIGS. 2A through 2C, and corresponding FIGS. 4A through 4C.

Once the NIR greyscale images are processed using NIR greyscale image to preconditioning level mapping database to determine a preconditioning level and preconditioning parameter adjustments at operation 913, process flow proceeds to operation 914.

In one embodiment, at operation 914 any preconditioning parameters that it is determined must be adjusted are adjusted via one or more actions such as any actions discussed above with respect to FIG. 8.

Once any preconditioning parameters that it is determined must be adjusted are adjusted at operation 914, process flow proceeds to END operation 934 where process 900 is exited to await new samples and/or data.

Figure 10:
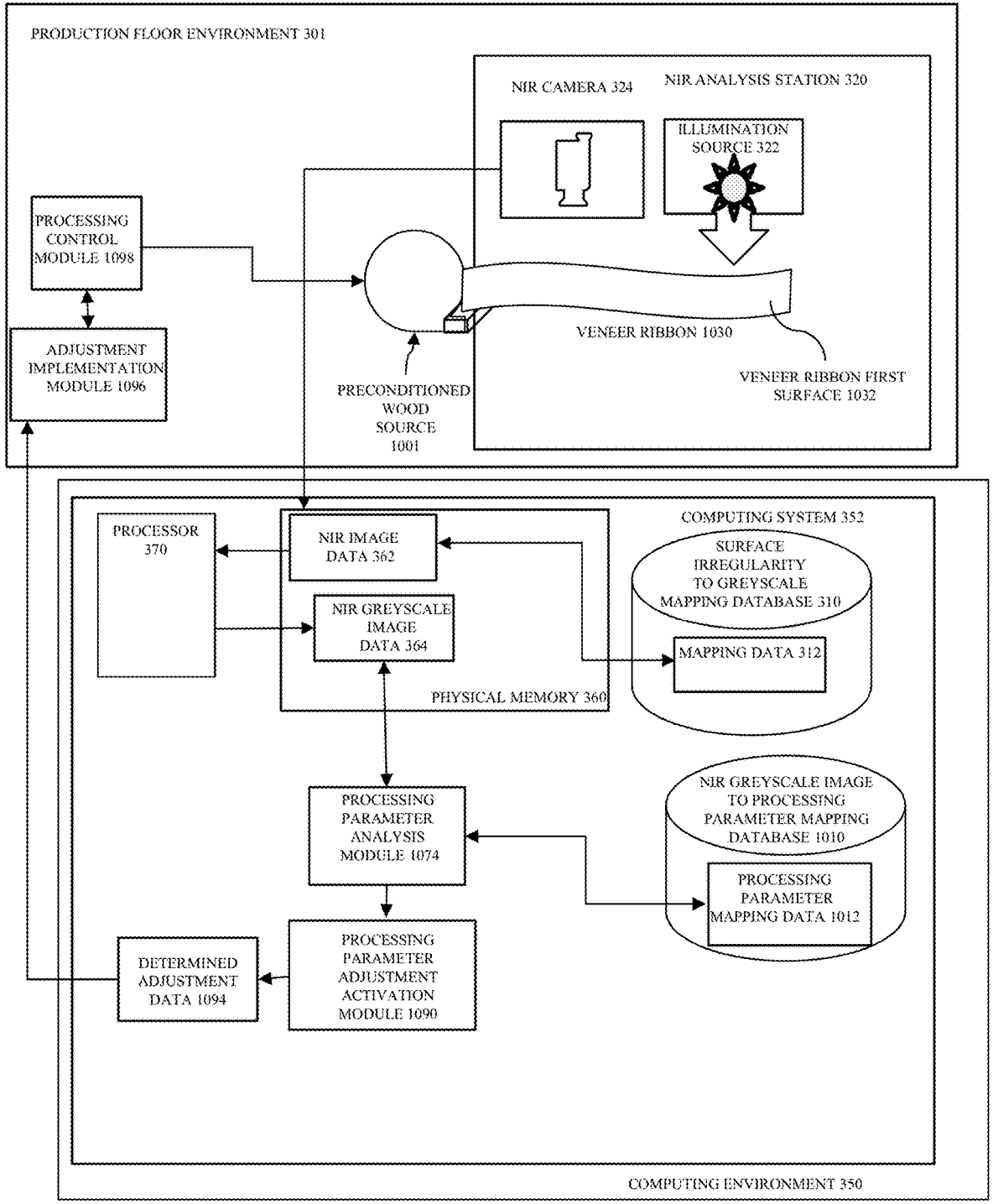
FIG. 10 is simplified block diagram of a system for adjusting processing parameters used to produce wood products from a wood source based on a level of irregularity of a first surface of the wood products in accordance with one embodiment.

FIG. 10 is simplified block diagram of a system 1000 for adjusting processing parameters used to produce wood products from a wood source based on a NIR images of a surface of the wood products in accordance with one embodiment.

As with system 300 discussed above with respect to FIG. 3A, in one embodiment, system 1000 includes production floor environment 301 and computing environment 350. As seen in FIG. 10, production floor environment 301 includes NIR analysis station 320. As seen in FIG. 10, NIR analysis station 320 includes one or more illumination sources, such as illumination source 322, positioned to illuminate a surface of a wood product. In various embodiments, the one or more illumination sources, such as illumination source 322, can include one or more LED light sources. In other embodiments, the one or more illumination sources, such as illumination source 322, can include, but are not limited to, halogen, halogen and tungsten light sources, or any other light sources, as discussed herein, and/or as known in the art at the time of filing, and/or as developed after the time of filing.

As with system 300 discussed above with respect to FIG. 3A, in FIG. 10, NIR analysis station 320 also includes one or more NIR cameras, such as NIR camera 324, positioned to capture NIR image data 362 representing one or more NIR images of the illuminated surface of the wood product. In one embodiment, the one or more NIR cameras, such as NIR camera 324, are adjustably positioned and adjustably focused to capture any desired one or more NIR images of the illuminated surface of the wood product.

As seen in FIG. 10, and as discussed below, a wood product to be analyzed in the NIR analysis station 320 is positioned in NIR analysis station 320. In the specific illustrative example of FIG. 10, the wood product is a veneer ribbon 1030 rotary cut from preconditioned wood source 1001, such as a preconditioned peeler log.

In one embodiment, the veneer ribbon 1030 to be analyzed is positioned such that a veneer ribbon first surface 1032 of the veneer ribbon 1030 to be analyzed is illuminated by the illumination source 322 and a sample portion of veneer ribbon first surface 1032 is within view and focus of NIR camera 324. In one embodiment, the veneer ribbon 1030 is positioned in the NIR analysis station 320 by passing the veneer ribbon 1030 through the NIR analysis station 320 on a conveyor system.

In various embodiments, the one or more NIR cameras, such as NIR camera 324, can be of any resolution desired. As noted above, when the one or more NIR cameras, such as NIR camera 324, are used to scan the veneer ribbon first surface 1032 of a veneer ribbon 1030 for irregularities and create an NIR image data 362 of the veneer ribbon first surface 1032, essentially each pixel generated by NIR camera 324 is a sample point. Consequently, the resolution and accuracy of the surface irregularity detection process is only limited by the number of pixels the NIR camera 324 has covering the field of view, e.g., the entire veneer ribbon first surface 1032 of veneer ribbon 1030. Consequently, in the case where NIR camera 324 is a 1.3 mega pixel camera, there are essentially 1,300,000 individual measurement points on the veneer ribbon first surface 1032. In addition, NIR wavelengths are in the range of 750 nanometers (nm) to 3500 nm which are much smaller that the visible wavelengths of 380 to 740 nm. Consequently, using NIR cameras, such as NIR camera 324, results in resolutions and accuracy that simply cannot be achieved using traditional surface magnified visual image methods.

Therefore, using NIR cameras, such as NIR camera 324, system 1000 is capable of detecting irregularities in a wide range of samples sizes ranging from of a traditional 2"×2" square, to a full 4'×10' sheet or panel surface, and, by using a series of NIR images spliced together, up to a 100'-120' ribbon of material. This, in turn, allows the disclosed embodiments to be implemented without significantly slowing down the production process or increasing the cost of the finished wood product.

As seen in FIG. 10, in this specific illustrative example, production floor environment 301 also includes adjustment implementation module 1096 for making relative real time adjustment to processing parameters for preconditioned wood source 1001 to generate veneer ribbon 1030 and processing control module 1098 which controls the processing of preconditioned wood source 1001 to generate veneer ribbon 1030.

As seen in FIG. 10, computing environment 350 includes computing system 352. As seen in FIG. 10, in one embodiment, computing system 352 includes surface irregularity to greyscale mapping database 310 containing mapping data 312 that maps surface irregularities to Near InfraRed (NIR) image greyscale values for one or more wood products.

As noted above with respect to FIG. 3A, using NIR images, extremely granular differences in irregularity levels can be detected. In general, locations with different levels of irregularities absorb/reflect different amounts of NIR radiation at specific frequencies. In operation, when NIR radiation of a given frequency is applied to a veneer ribbon first surface 1032 of veneer ribbon 1030, more NIR energy is reflected from surfaces that are perpendicular the NIR camera lens. Consequently, at locations having irregularities such that the surfaces are not perpendicular the NIR camera lens will appear darker, i.e., have a greater greyscale value.

When the NIR camera 324 takes an image of the veneer ribbon first surface 1032, the NIR camera 324 picks up the NIR energy reflected off veneer ribbon first surface 1032 at approximately 90 degrees. Consequently, when the NIR camera 324 takes an image of the veneer ribbon first surface 1032, the areas of irregularities, which scatter more NIR energy at angles other than 90 degrees and therefore reflect less NIR energy, appear darker than dry areas. In addition, the higher or more significant the irregularities that are present, the darker the area appears because less NIR energy is reflected to be captured by the NIR camera 324.

Using this fact, NIR image data 362 captured by the NIR camera 324 can be processed into NIR greyscale image data 364. Greyscale images can be of varying resolution, or bit, types. A 16-bit integer greyscale image provides 65535 available tonal steps from 0 (black) to 65535 (white). A 32-bit integer greyscale image theoretically will provide 4,2114,1167,2115 tonal steps from 0 (black) to 4211411672115 (white). Converting an NIR image based on these number of greyscale tonal steps results in a margin of error of significantly less than 0.1%.

In some embodiments, two or more NIR cameras are utilized, such as NIR camera 324, that are operated at different NIR frequencies and/or that are positioned a different angles with respect to veneer ribbon first surface 1032. This allows different types and levels of irregularities to be detected. In addition, using two or more NIR cameras, such as NIR camera 324, that are positioned at different angles means that different irregularities will have surfaces perpendicular to the camera lens and therefore will yield a 3-D effect when a composite NIR image is constructed. A more detailed discussion of a one example of a multi-NIR camera system is discussed above with respect to FIG. 3B.

Returning to FIG. 10, using the concepts discussed above, the mapping data 312 of surface irregularity to greyscale mapping database 310 is obtained through one or more empirical and/or manual processes, as discussed above with respect to FIG. 3A.

FIGS. 4A to 4F are illustrative examples of NIR images of surfaces of veneer ribbons produced various optimal and non-optimal production parameters. In the specific examples of FIGS. 4A to 4F the NIR image illustrations of 4A, 4B, 4C, 4D, 4E and 4F, correlate to the magnified visual image illustrations of FIGS. 2A, 2B, 2C, 2D, 2E and 2F, respectively.

Of particular relevance to system 1000, and adjusting process parameters, FIG. 4D is a representation of an NIR image of the surface of a veneer ribbon or sheet that was produced under conditions where the cutting knife edge was irregular, nicked, or otherwise damaged, FIG. 4E is a representation of an NIR image of the surface of a veneer ribbon or sheet that was produced under conditions where the cutting knife edge was not held against the surface of the preconditioned log with a steady pressure, and FIG. 4F is a representation of an NIR image of the surface of a veneer ribbon or sheet that was produced under conditions where the cutting knife was dull.

Likewise, in the specific illustrative examples of FIGS. 2D and 4D, sample wood products determined empirically to be produced under conditions where the cutting knife edge was irregular, nicked, or otherwise damaged, such as shown in FIG. 2D, can be passed through NIR analysis station 320 to generate known irregular cutting knife edge NIR images of surface 433 of veneer ribbon 431, as shown in FIG. 4D.

Likewise, in the specific illustrative examples of FIGS. 2E and 4E, sample wood products determined empirically to be produced under conditions where the cutting knife edge was not held against the surface of the preconditioned log with a steady pressure, such as shown in FIG. 2E, can be passed through NIR analysis station 320 to generate known irregular cutting knife pressure NIR images of surface 443 of veneer ribbon 441, as shown in FIG. 4E.

Similarly, in the specific illustrative examples of FIGS. 2F and 4F, sample wood products determined empirically to be produced under conditions where the cutting knife edge was dull, such as shown in FIG. 2F, can be passed through NIR analysis station 320 to generate known dull cutting knife NIR images of surface 453 of veneer ribbon 451, as shown in FIG. 4F.

This process is continued for multiple levels and types of surface irregularities and greyscale data for each irregularity increment is determined and correlated to the respective surface irregularities increment and one or more processing parameter values. In this way, mapping data 312 mapping each specific surface irregularities to specific greyscale values is generated for wood products. The process can then be repeated for different wood products, different types of wood, and under varying parameters and conditions. Consequently, the specific examples discussed herein are but illustrative examples and do not limit the scope of the invention as set forth in the claims below.

Returning the FIG. 10, computing system 352 also includes NIR greyscale image to processing parameter mapping database 1010. In one embodiment, NIR greyscale image to processing parameter mapping database 1010 includes processing parameter mapping data 1012 that maps NIR greyscale images to particular processing parameters and issues based on known data obtained from known processing greyscale images, such as images 4D, 4E, and 4F.

Computing system 352 also includes physical memory 360. In one embodiment, the physical memory 360 includes NIR image data 362 representing one or more NIR images of the illuminated veneer ribbon first surface 1032 of the veneer ribbon 1030 captured using NIR camera 324. Physical memory 360 also includes NIR greyscale image data 364. In one embodiment, computing system 352 includes one or more processors 370 for processing the NIR image data representing one or more NIR images of the illuminated veneer ribbon first surface 1032 of the veneer ribbon 1030 to generate NIR greyscale image data 364 indicating different irregularity levels and types in the illuminated veneer ribbon first surface 1032 of the veneer ribbon 1030.

In one embodiment, processor 370 processes the NIR greyscale image data 364 using the mapping data 312 from surface irregularity to greyscale mapping database 310 to identify irregularity levels and types for the veneer ribbon first surface 1032 of the veneer ribbon 1030.

As seen in FIG. 10, in one embodiment, computing system 352 includes a processing parameter analysis module 1074 which analyzes processing parameter mapping data 1012 and NIR greyscale image data 364 to determine a processing parameter maladjustment or issue represented by processing parameter mapping data 1012. In various embodiments, processing parameter analysis module 1074 determines which, if any, processing parameters must be changed to adjust the processing of subsequent wood products, such as veneer ribbon 1030, from the same wood source 1001.

In some embodiments, processing parameter analysis module 1074 includes one or more machine learning based models such as any machine learning based models discussed herein, and/or as known in the art at the time of filing, and/or as become known/available after the time of filing.

For instance, based on the analysis of NIR greyscale image data 364 and processing parameter mapping data 1012, processing parameter analysis module 1074 may determine: a knife or other processing component needs replacement; a probability that a rotation speed of a lath turning the wood source 1001 needs adjusting; an angle of a knife used to cut the veneer ribbon 1030 from the wood source 1001 needs adjusting; and a pressure used to keep a knife used to cut veneer ribbon 1030 from the wood source 1001 in contact with a surface of the wood source 1001 needs adjustment or a repair.

Processing parameter analysis module 1074 may determine any combination, or all, of these processing parameters, or other processing parameters, need to be adjusted. In various embodiments, the adjustments determined to be necessary by processing parameter analysis module 1074 are then provided to processing parameter adjustment activation module 1090 which is used to generate determined adjustment data 1094.

In various embodiments, determined adjustment data 1094 is then transferred to adjustment implementation module 1096 in production floor environment 301. Adjustment implementation module 1096 then causes processing control module 1098 to make the desired adjustments to the processing of preconditioned wood source 1001 into veneer ribbon 1030. As noted, these adjustments can include: replacing a knife or other processing component; adjusting a rotation speed of a lath turning the wood source 1001; adjusting an angle of a knife used to cut the veneer ribbon 1030 from the wood source 1001; and adjusting or making repairs so that a pressure used to keep a knife used to cut veneer ribbon 1030 from the wood source 1001 in contact with a surface of the wood source 1001.

Using system 1000 the processing parameters so critical to veneer ribbon 1030 production can be adjusted dynamically using feedback based on actual wood product NIR surface image analysis. In one embodiment, these adjustments are made as veneer ribbon 1030 is being created from a single wood source 1001, such as a single preconditioned log. Consequently, using system 1000, provides a technical solution to the long-standing technical problem of adjusting processing parameters for optimal results from a single wood source before significant amounts of defective wood product have been produced to minimize wasted product and maximize product value in relative real time.

Those of skill in the art will ready recognize that the specific illustrative examples of one embodiment of a production floor environment 301 and components shown in FIG. 10 are but specific examples of numerous possible production environments and arrangement of physical components. Consequently, the specific illustrative example of an embodiment of a production floor environment 301 and components shown in FIG. 10 is not intended to limit the scope of the invention as set forth in the claims below.

As a specific illustrative example of potential variations, in various embodiments, the NIR analysis station 320 can include one or more illumination sources 322 positioned to illuminate two or more surfaces of a wood product and one or more NIR cameras 324 positioned to capture one or more NIR images of the two or more illuminated surfaces of the wood product.

As a further specific illustrative example of variations possible, additional input data can be considered such as current ambient temperature and humidity. The combination of these parameters can be analyzed by an AI/ML algorithm to further refine the production parameters for overall process efficiency.

These and numerous other variations are possible and contemplated by the inventors to be within the scope of the invention as set forth in the claims below.

Figure 11:
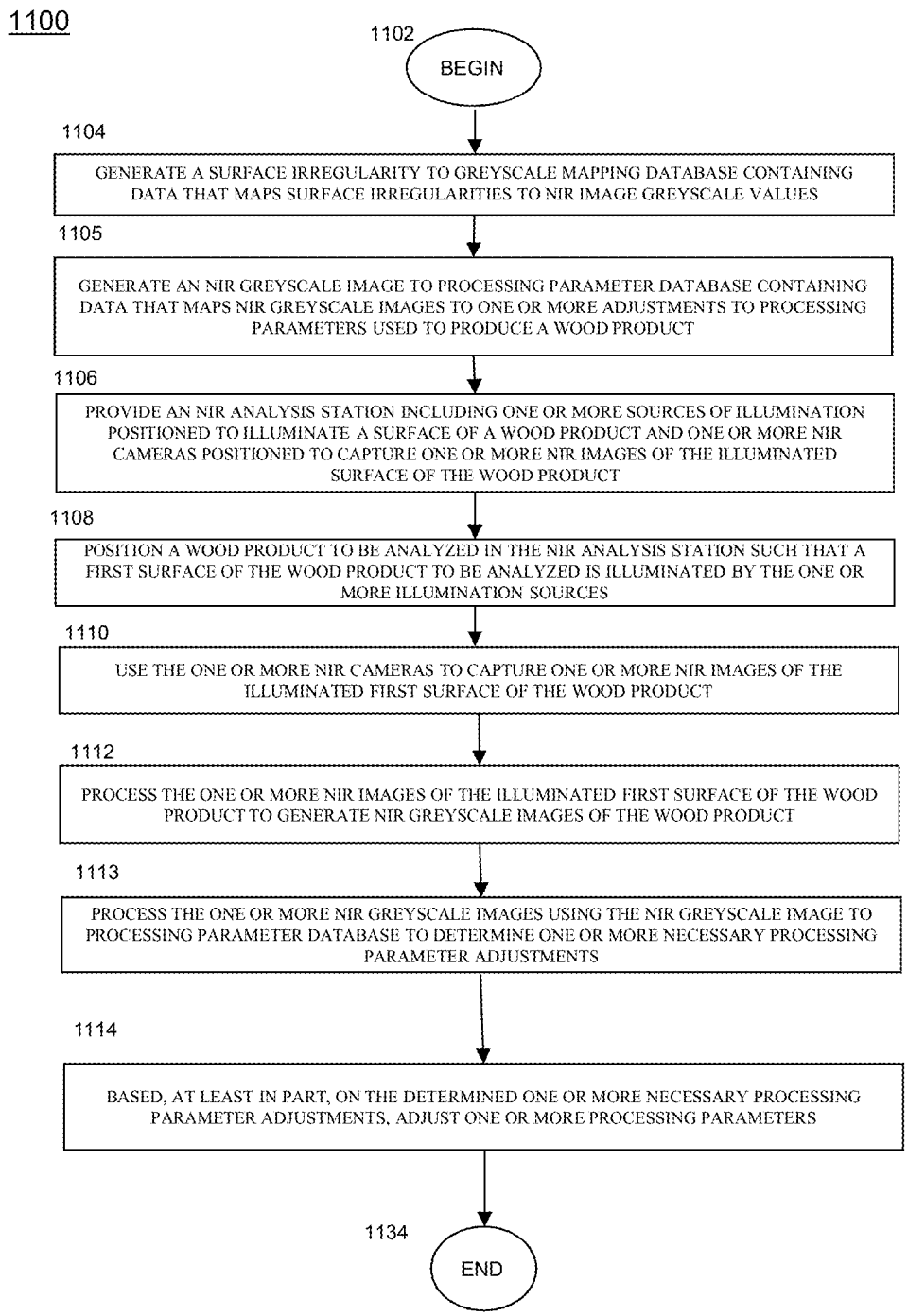
FIG. 11 is flow chart of a process for adjusting processing parameters used to produce wood products from a wood source based on a level of irregularity of a first surface of the wood products in accordance with one embodiment.

FIG. 11 is a flow chart of a process 1100 for adjusting processing parameters used to produce wood products from a wood source based on a level of irregularity of a first surface of the wood products in accordance with one embodiment.

As seen in FIG. 11, process 1100 begins at BEGIN operation 1102 and then process proceeds to operation 1104. In one embodiment, at operation 1104 a surface irregularity level to greyscale mapping database is generated such as any database discussed above with respect to FIG. 3A, FIG. 10, FIGS. 2A through 2C, and corresponding FIGS. 4D through 4F. In one embodiment, the surface irregularity level to greyscale mapping database contains mapping data that maps surface irregularities to Near InfraRed (NIR) image greyscale values for one or more wood products.

Once a surface irregularity level to greyscale mapping database is generated at operation 1104, process flow proceeds to operation 1105. In one embodiment, at operation 1105 an NIR greyscale image to processing parameter mapping database is generated using any of the methods and systems discussed above with respect to FIG. 10.

Once an NIR greyscale image to processing parameter mapping database is generated at operation 1105, process flow proceeds to operation 1106. At operation 1106, an NIR analysis station is provided. In one embodiment, the NIR analysis station is substantially similar to any NIR analysis station discussed above with respect to FIGS. 3A, 3B, and 10. As discussed above, in one embodiment, the NIR analysis station includes one or more sources of illumination positioned to illuminate a surface of a wood product and one or more NIR cameras positioned to capture one or more NIR images of the illuminated surface of the wood product.

Once an NIR analysis station is provided at operation 1106, process flow proceeds to operation 1108. In one embodiment, at operation 1108, a wood product to be analyzed is positioned in the NIR analysis station of operation 1106 such that a first surface of the wood product to be analyzed is illuminated by the one or more illumination sources using any of the methods and systems discussed above with respect to FIG. 3A, FIG. 10, FIGS. 2A through 2C, and corresponding FIGS. 4D through 4F.

Once the wood product to be analyzed is positioned in the NIR analysis station at 1108, process flow proceeds to operation 1110. In one embodiment, at operation 1110 the one or more NIR cameras of NIR analysis station take one or more NIR images of the illuminated first surface of the wood product using any of the methods and systems discussed above with respect to FIG. 3A, FIG. 10, FIGS. 2A through 2C, and corresponding FIGS. 4D through 4F.

Once the one or more NIR cameras of NIR analysis station take one or more NIR images of the illuminated first surface of the wood product at operation 1110, process flow proceeds to operation 1112.

In one embodiment, at operation 1112, the one or more NIR images of the illuminated first surface of the wood product of operation 1110 are processed using any of the methods and systems discussed above with respect to FIGS. 3A, 3B, FIG. 10, FIGS. 2D through 2F, and corresponding FIGS. 4D through 4F, to generate NIR greyscale images indicating different irregularities in the illuminated first surface of the wood product.

Once the one or more NIR images of the illuminated first surface of the wood product are processed to generate NIR greyscale images indicating different irregularities in the illuminated first surface of the wood product at operation 1112, process flow proceeds to operation 1113.

In one embodiment, at operation 1113, the NIR greyscale images are processed using the NIR greyscale image to processing parameter mapping database to determine processing parameter adjustments required using any of the methods and systems discussed above with respect to FIGS. 3A and 3B, FIG. 10, FIGS. 2D through 2F, and corresponding FIGS. 4D through 4F.

Once the NIR greyscale images are processed using NIR greyscale image to processing parameter mapping database to determine processing parameter adjustments at operation 1113, process flow proceeds to operation 1114.

In one embodiment, at operation 1114 any processing parameters that it is determined must be adjusted are adjusted via one or more actions such as any actions discussed above with respect to FIG. 10.

Once any processing parameters that it is determined must be adjusted are adjusted at operation 1114, process flow proceeds to END operation 1134 where process 1100 is exited to await new samples and/or data.

The disclosed embodiments utilize NIR cameras to scan the surface of a wood product for irregularities and create an NIR image of the surface of the wood product. Since essentially each pixel of camera image data is a sample point, the resolution and accuracy of the surface irregularity detection process is only limited by the number of pixels the camera has covering the field of view, e.g., the entire first surface of a wood product. Consequently, in the case where a 1.3 mega pixel camera is used there are essentially 1,300,000 individual measurement points on the surface of the wood product. In addition, NIR wavelengths are in the range of 750 nanometers (nm) to 3500 nm which are much smaller that the visible wavelengths of 380 to 740 nm. Consequently, the use of NIR cameras as disclosed herein results in resolutions and accuracy that simply cannot be achieved using traditional visual irregularity detection systems.

In addition, when, as disclosed herein, NIR cameras are used as the surface irregularity detection mechanism, if greater or less resolution is deemed necessary, a higher or lower mega-pixel camera can be selected to achieve the desired resolution for the process. This can be accomplished in a relatively simple and quick camera switch out procedure. In addition, NIR camera placement with respect to the sample under analysis can be adjusted such that a quality image can be obtained as long as there is a clear field of view between the wood product surface and NIR camera. Horizontal, vertical, or angled placements have no impact on the functionality of the NIR camera.

Therefore, the disclosed technical solution is capable of detecting irregularities in a wide range of samples sizes ranging from of a traditional 2"×2" square, to a full 4'×8' sheet or panel surface, and, by using a series of NIR images spliced together, up to a 80'-120' ribbon of material. This, in turn, allows the disclosed embodiments to be implemented without significantly slowing down the production process or increasing the cost of the finished wood product.

The use of NIR cameras, as disclosed herein, eliminates the need for any offline magnification of the wood product or the need for the surface irregularity detection device, i.e., the NIR camera, to be close to the surface of a wood product. This allows for more flexible placement of the sample taking device, i.e., the NIR camera.

In addition, unlike visual based detection methods NIR cameras are virtually immune to ambient visible light and interference. Consequently, use of NIR cameras as disclosed herein is far more suitable for a physical production line environment.

Further, NIR technology has been determined to be safe, i.e., representing no hazards to workers or other devices, by several testing and safety agencies. Consequently, the use of the disclosed NIR based surface irregularity detection systems results in a safe, comfortable, and efficient workplace and production floor.

Using the disclosed embodiments, surface irregularities on the surface of wood products can be identified efficiently, effectively, and quickly, while the production line continues operation at normal speeds, consequently, implementation of the disclosed embodiments, does not slow down production speed or change product processing time.

As a result, using the information available from the disclosed embodiments, preconditioning parameters for subsequent wood sources used to produce subsequent wood products can be evaluated and adjusted without slowing down the production line. These preconditioning parameters include the amount of chemical used in a preconditioning liquid used to precondition the wood source; the type of chemical used in a preconditioning liquid used to precondition the wood source; the time the wood source soaks in a preconditioning liquid used to precondition wood source; and the temperature of a preconditioning liquid used to precondition the wood source. Consequently, the disclosed embodiments provide a technical solution to the long-standing technical problem of how to identify the interaction of these preconditioning and adjust the process for optimal results before significant amounts of defective wood product have been produced.

In addition, using the information available from the disclosed embodiments, one or more processing parameters can be adjusted and applied a single wood source is being processed into wood product in relative real time. These processing parameters include: replacing a knife or other processing component; adjusting a rotation speed of a lath turning the wood source; adjusting an angle between a knife used to cut the wood product from the wood source; and adjusting a pressure used to keep a knife used to cut wood product from the wood source in contact with a surface of the wood source. Consequently, the disclosed embodiments provide a technical solution to the long-standing technical problem of adjusting processing parameters for optimal results from a single wood source before significant amounts of defective wood product have been produced.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for adjusting a production process of a wood product based on surface irregularities comprising:
    generating a surface irregularity to greyscale mapping database, the surface irregularity level to greyscale mapping database containing data that maps surface irregularities to Near InfraRed (NIR) image greyscale values for one or more wood products;
    generating an NIR greyscale image to preconditioning level database, the NIR greyscale image to preconditioning level database mapping NIR greyscale images of a surface of a wood product to a preconditioning level of wood source used to produce the wood product;
    providing an NIR analysis station, the NIR analysis station including one or more sources of illumination positioned to illuminate a surface of a wood product, the NIR analysis station including one or more NIR cameras positioned to capture one or more NIR images of the illuminated surface of the wood product;
    positioning a wood product to be analyzed in the NIR analysis station such that a first surface of the wood product to be analyzed is illuminated by the one or more illumination sources;
    capturing, using the one or more NIR cameras, one or more NIR images of the illuminated first surface of the wood product;
    processing the one or more NIR images of the illuminated first surface of the wood product to generate NIR greyscale images indicating irregularities in the illuminated first surface of the wood product;
    processing the NIR greyscale images using the NIR greyscale image to preconditioning level database to determine a preconditioning level of wood source used to produce the wood product;
    based on the determined preconditioning level of wood source used to produce the wood product, adjusting one or more preconditioning parameters for subsequent wood sources used to produce subsequent wood products.

2. The method for adjusting a production process of a wood product based on surface irregularities of claim 1 wherein the one or more sources of illumination include one or more LED light sources.

3. The method for ensuring the quality of a wood product based on surface irregularities of claim 1 wherein the one or more NIR cameras are adjustably positioned to capture one or more NIR images of the illuminated surface of the wood product.

4. The method for adjusting a production process of a wood product based on surface irregularities of claim 1 wherein positioning a wood product to be analyzed in the NIR analysis station is accomplished by passing the wood product through the NIR analysis station on a conveyor system.

5. The method for adjusting a production process of a wood product based on surface irregularities of claim 1 wherein the wood source for the wood product is a preconditioned log and the wood product is a veneer ribbon.

6. The method for adjusting a production process of a wood product based on surface irregularities of claim 1 wherein the one or more preconditioning parameters include:
    an amount of chemical used in a preconditioning liquid used to precondition the wood sources;
    a type of chemical used in a preconditioning liquid used to precondition the wood sources;
    a time the logs soak in a preconditioning liquid used to precondition the wood sources; and
    a temperature of a preconditioning liquid used to precondition the wood sources.

7. The method for adjusting a production process of a wood product based on surface irregularities of claim 1 further comprising:
    an NIR analysis station including one or more sources of illumination positioned to illuminate a surface of a wood product, the NIR analysis station including at least three NIR cameras positioned to capture one or more NIR images of the illuminated surface of the wood product, the at least three NIR cameras including;

a first NIR camera positioned to capture one or more NIR images of the illuminated surface of the wood product at a first angle with respect to a line parallel to the illuminated surface of the wood product;

a second NIR camera positioned to capture one or more NIR images of the illuminated surface of the wood product at a second angle with respect to a line parallel to the illuminated surface of the wood product, the second angle being different from the first angle; and a third NIR camera positioned to capture one or more NIR images of the illuminated surface of the wood product at a third angle with respect to a line parallel to the illuminated surface of the wood product, the third angle being different from the first angle.

8. The method for adjusting a production process of a wood product based on surface irregularities of claim 7 wherein the first angle is approximately 45 degrees, the second angle is approximately 90 degrees, and the third angle is approximately 135 degrees.

9. A method for adjusting a production process of a wood product based on surface irregularities comprising:

generating a surface irregularity level to greyscale mapping database, the surface irregularity level to greyscale mapping database containing data that maps surface irregularities to Near InfraRed (NIR) image greyscale values for one or more wood products;

generating a NIR greyscale image to processing parameter database, the NIR greyscale image to processing parameter database mapping NIR greyscale images of a surface of a wood product to one or more adjustments to processing parameters used to produce the wood product;

providing an NIR analysis station, the NIR analysis station including one or more sources of illumination positioned to illuminate a surface of a wood product, the NIR analysis station including one or more NIR cameras positioned to capture one or more NIR images of the illuminated surface of the wood product;

positioning a wood product to be analyzed in the NIR analysis station such that a first surface of the wood product to be analyzed is illuminated by the one or more illumination sources;

capturing, using the one or more NIR cameras, one or more NIR images of the illuminated first surface of the wood product;

processing the one or more NIR images of the illuminated first surface of the wood product to generate NIR greyscale images indicating irregularities in the illuminated first surface of the wood product;

processing the NIR greyscale images using the NIR greyscale image to processing parameter database to determine a necessary processing parameter adjustment;

based on the determined necessary processing parameter adjustment, adjusting a processing parameter for producing subsequent wood product from the wood source.

10. The method for adjusting a production process of a wood product based on surface irregularities of claim 9 wherein the one or more sources of illumination include one or more LED light sources.

11. The method for ensuring the quality of a wood product based on surface irregularities of claim 9 wherein the one or more NIR cameras are adjustably positioned to capture one or more NIR images of the illuminated surface of the wood product.

12. The method for adjusting a production process of a wood product based on surface irregularities of claim 9 wherein positioning a wood product to be analyzed in the NIR analysis station is accomplished by passing the wood product through the NIR analysis station on a conveyor system.

13. The method for adjusting a production process of a wood product based on surface irregularities of claim 9 wherein the wood source for the wood product is a preconditioned log and the wood product is a veneer ribbon.

14. The method for adjusting a production process of a wood product based on surface irregularities of claim 9 wherein the one or more processing parameters adjusted for producing subsequent wood product from the wood source include:

replacing a knife or other processing component;

adjusting a rotation speed of a lath turning the wood source;

adjusting an angle between a knife used to cut wood product from the wood source; and adjusting a pressure used to keep a knife used to cut wood product from the wood source in contact with a surface of the wood source.

15. The method for adjusting a production process of a wood product based on surface irregularities of claim 9 further comprising:

an NIR analysis station including one or more sources of illumination positioned to illuminate a surface of a wood product, the NIR analysis station including at least three NIR cameras positioned to capture one or more NIR images of the illuminated surface of the wood product, the at least three NIR cameras including;

a first NIR camera positioned to capture one or more NIR images of the illuminated surface of the wood product at a first angle with respect to a line parallel to the illuminated surface of the wood product;

a second NIR camera positioned to capture one or more NIR images of the illuminated surface of the wood product at a second angle with respect to a line parallel to the illuminated surface of the wood product, the second angle being different from the first angle; and a third NIR camera positioned to capture one or more NIR images of the illuminated surface of the wood product at a third angle with respect to a line parallel to the illuminated surface of the wood product, the third angle being different from the first angle.

16. The method for adjusting a production process of a wood product based on surface irregularities of claim 9 wherein the first angle is approximately 45 degrees, the second angle is approximately 90 degrees, and the third angle is approximately 135 degrees.

17. A method for adjusting a production process of a veneer ribbon based on a level of irregularity of a veneer ribbon surface comprising:

training one or more machine learning based production adjustment models using Near InfraRed (NIR) image data for one or more veneer ribbons and determined corresponding preconditioning levels of logs used to produce the one or more veneer ribbons;

providing an NIR analysis station, the NIR analysis station including one or more sources of illumination positioned to illuminate a surface of a veneer ribbon, the NIR analysis station including one or more NIR cameras positioned to capture one or more NIR images of the illuminated surface of the veneer ribbon;

positioning a portion of the veneer ribbon to be analyzed in the NIR analysis station such that a first surface of the veneer ribbon to be analyzed is illuminated by the one or more illumination sources;

capturing, using the one or more NIR cameras, one or more NIR images of the illuminated first surface of the veneer ribbon;

processing the one or more NIR images of the illuminated first surface of the veneer ribbon to generate NIR greyscale images indicating irregularities in the illuminated first surface of the veneer ribbon;

providing the NIR image data for the illuminated first surface of the veneer ribbon to the one or more trained machine learning based production adjustment models;

obtaining production parameter prediction data for the veneer ribbon from the one or more trained machine learning based surface irregularity prediction models;

based on the production parameter prediction data for the veneer ribbon, adjusting one or more production parameters for subsequent veneer ribbons.

18. The method for adjusting a production process of a veneer ribbon based on a level of irregularity of a veneer ribbon surface of claim 17 wherein the one or more production parameters for subsequent veneer ribbons are preconditioning parameters for subsequent logs used to produce subsequent wood veneer ribbons and include: an amount of chemical used in a preconditioning liquid used to precondition logs; a type of chemical used in a preconditioning liquid used to precondition logs; a time the logs soak in a preconditioning liquid used to precondition logs; and a temperature of a preconditioning liquid used to precondition logs.

19. The method for adjusting a production process of a veneer ribbon based on a level of irregularity of a veneer ribbon surface of claim 17 wherein the one or more production parameters for subsequent veneer ribbons are processing parameters adjusted for producing subsequent veneer from the log source of the veneer ribbon and include:

replacing a knife or other processing component;

adjusting a rotation speed of a lath turning the log;

adjusting an angle between a knife used to cut the veneer ribbon from the log; and adjusting a pressure used to keep a knife used to cut veneer ribbon from the log in contact with a surface of the log.

20. The method for adjusting a production process of a veneer ribbon based on a level of irregularity of a veneer ribbon surface of claim 17 further comprising:

an NIR analysis station including one or more sources of illumination positioned to illuminate a surface of a veneer ribbon, the NIR analysis station including at least three NIR cameras positioned to capture one or more NIR images of the illuminated surface of the veneer ribbon;

a first NIR camera positioned to capture one or more NIR images of the illuminated surface of the veneer ribbon at a first angle with respect to a line parallel to the illuminated surface of the veneer ribbon;

a second NIR camera positioned to capture one or more NIR images of the illuminated surface of the veneer ribbon at a second angle with respect to a line parallel to the illuminated surface of the veneer ribbon, the second angle being different from the first angle; and a third NIR camera positioned to capture one or more NIR images of the illuminated surface of the veneer ribbon at a third angle with respect to a line parallel to the illuminated surface of the veneer ribbon, the third angle being different from the first angle.

* * * * *